United States Patent
Lin et al.

(10) Patent No.: US 9,646,022 B2
(45) Date of Patent: May 9, 2017

(54) DISTRIBUTED CHANGE NOTIFICATIONS FOR A DISTRIBUTED FILESYSTEM

(71) Applicant: Panzura, Inc., Campbell, CA (US)

(72) Inventors: Yun Lin, Bellevue, WA (US); John Richard Taylor, Tiburon, CA (US)

(73) Assignee: PANZURA, INC., Campbell, CA (US)

( * ) Notice: Subject to any disclaimer, the term of this patent is extended or adjusted under 35 U.S.C. 154(b) by 179 days.

(21) Appl. No.: 14/298,598

(22) Filed: Jun. 6, 2014

(65) Prior Publication Data
US 2015/0356116 A1     Dec. 10, 2015

(51) Int. Cl.
*G06F 17/30* (2006.01)
(52) U.S. Cl.
CPC .............................. *G06F 17/30212* (2013.01)
(58) Field of Classification Search
None
See application file for complete search history.

(56) References Cited

U.S. PATENT DOCUMENTS

| | | | |
|---|---|---|---|
| 7,516,132 B1* | 4/2009 | Fast | H04L 67/1095 707/999.008 |
| 8,635,271 B1* | 1/2014 | Adya | H04L 63/0807 709/203 |
| 2010/0312995 A1* | 12/2010 | Sung | H04L 67/38 712/220 |
| 2013/0110778 A1* | 5/2013 | Taylor | G06F 17/30215 707/624 |
| 2014/0059217 A1* | 2/2014 | Pizurica | H04L 43/08 709/224 |
| 2015/0019701 A1* | 1/2015 | Marvin | G06F 9/542 709/223 |

* cited by examiner

*Primary Examiner* — Carol Choi
(74) *Attorney, Agent, or Firm* — Park, Vaughan, Fleming & Dowler LLP; Mark Spiller

(57) ABSTRACT

The disclosed embodiments disclose techniques for providing distributed change notifications for a distributed filesystem. Two or more cloud controllers collectively manage distributed filesystem data that is stored in the cloud storage systems; the cloud controllers ensure data consistency for the stored data, and each cloud controller caches portions of the distributed filesystem. During operation, a cloud controller receives a request from a client to access a file in the distributed filesystem. The cloud controller determines that the file needs strong read-after write consistency and sends a registration notification to the other cloud controllers of the distributed filesystem to request immediate notification of any changes to the file.

12 Claims, 13 Drawing Sheets

DISTRIBUTED CHANGE NOTIFICATIONS FOR A DISTRIBUTED FILESYSTEM

BACKGROUND

Field of the Invention

This disclosure generally relates to techniques for providing flexible and extensible network storage systems. More specifically, this disclosure relates to techniques for storing and collaboratively accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques for providing distributed change notifications for a distributed filesystem. Two or more cloud controllers collectively manage distributed filesystem data that is stored in the cloud storage systems; the cloud controllers ensure data consistency for the stored data, and each cloud controller caches portions of the distributed filesystem. During operation, a cloud controller receives a request from a client to access a file in the distributed filesystem. The cloud controller determines that the file needs strong read-after write consistency and sends a registration notification to the other cloud controllers of the distributed filesystem to request immediate notification of any changes to the file.

In some embodiments, files that are being collaborated upon by multiple clients and/or client processes need strong read-after-write consistency. Changes to such files are propagated to any other clients that are accessing the same file immediately after each given file is written and closed. Modified files that do not need strong read-after-write consistency are distributed between cloud controllers via lazy incremental metadata snapshots.

In some embodiments, a cloud controller sends a registration notification for a file to all of the other cloud controllers of the distributed filesystem. Each cloud controller tracks the set of registration notification requests received from other cloud controllers for files in the distributed filesystem. A second cloud controller that subsequently receives a file write and a subsequent file close request from a second client for the same file determines from its tracked set of registration notification requests that the first cloud controller has registered to receive change notifications for the modified file, and sends a change notification message for the modified file to the first cloud controller.

In some embodiments, a registration notification can request change notifications for a range of filesystem scopes that include: a specific file, a directory, and a portion of the distributed filesystem hierarchy.

In some embodiments, cloud controllers are configured to send change notification messages for a given modified file to only the set of cloud controllers that have previously sent notification requests with filesystem scopes that apply to the given modified file. This configuration supports strong read-after-write consistency while reducing the number of change notification messages that need to be sent between cloud controllers. Note that all cloud controllers (including cloud controllers that did not send notification requests for a given modified file) are also still informed of updates to the given modified file lazily via a subsequent incremental metadata snapshot.

In some embodiments, sending a registration notification with a coarse granularity of filesystem scope facilitates supporting strong read-after-write consistency for multiple files while reducing the number of registration notifications that are broadcast to all of the cloud controllers of the distributed filesystem.

In some embodiments, cloud controllers may determine that a file needs strong read-after-write consistency based on: (1) the file's extension, file type, and/or location in the filesystem hierarchy; (2) a set of heuristic-based techniques that analyze file contents and/or other file characteristics to determine a file type and/or predict access behavior; (3) a locality policy that identifies the file; and/or (4) tracked client file accesses that are used to dynamically identify files that are being collaboratively accessed by one or more clients.

In some embodiments, registration notifications are associated with an expiration time interval. Cloud controllers track the expiration time interval for each received registration notification and retire expired registration notifications.

In some embodiments, a cloud controller is configured to track the expiration time interval for a registration notification that it has sent to the other cloud controllers. Upon determining that its client will (or is likely to) access the file beyond the expiration time interval for the registration notification, the cloud controller sends a subsequent registration notification for the file prior to the expiration of the registration notification to ensure that no change notifications are missed between the expiration of the first registration notification and the receipt of the subsequent registration notification.

In some embodiments, a cloud controller that receives a request from a client to perform a namespace operation for a file is configured to send a change notification message for the namespace operation to all of the cloud controllers that have registered to receive change notifications for the file.

In some embodiments, a cloud controller receiving a change notification message for a file can send a synchronization message to the cloud controller that sent the change notification to retrieve the modifications that were made to the file by a remote client.

DETAILED DESCRIPTION

Figure 1A:
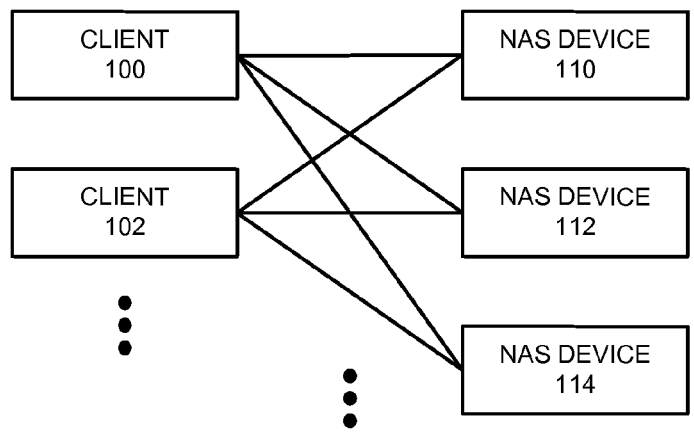
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
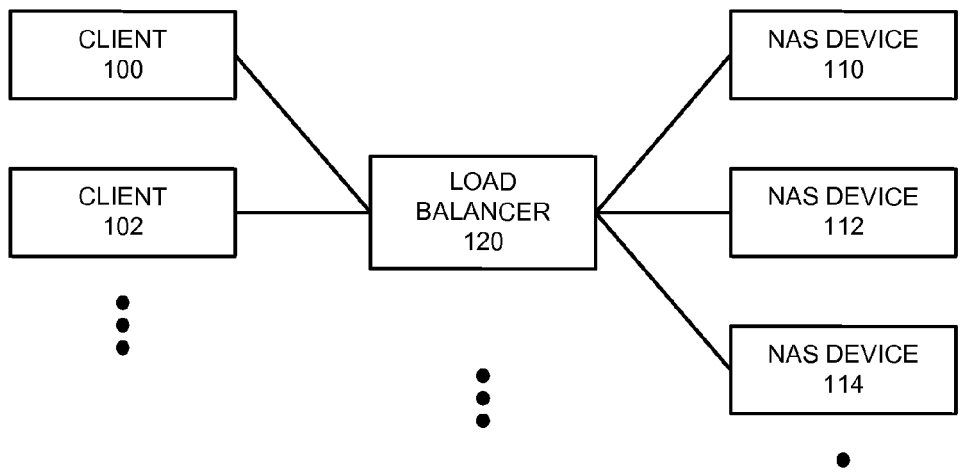
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
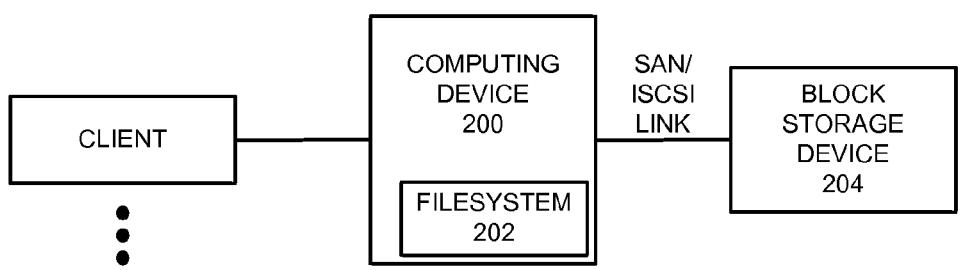
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that ensures that data can be accessed in a data-consistent manner.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
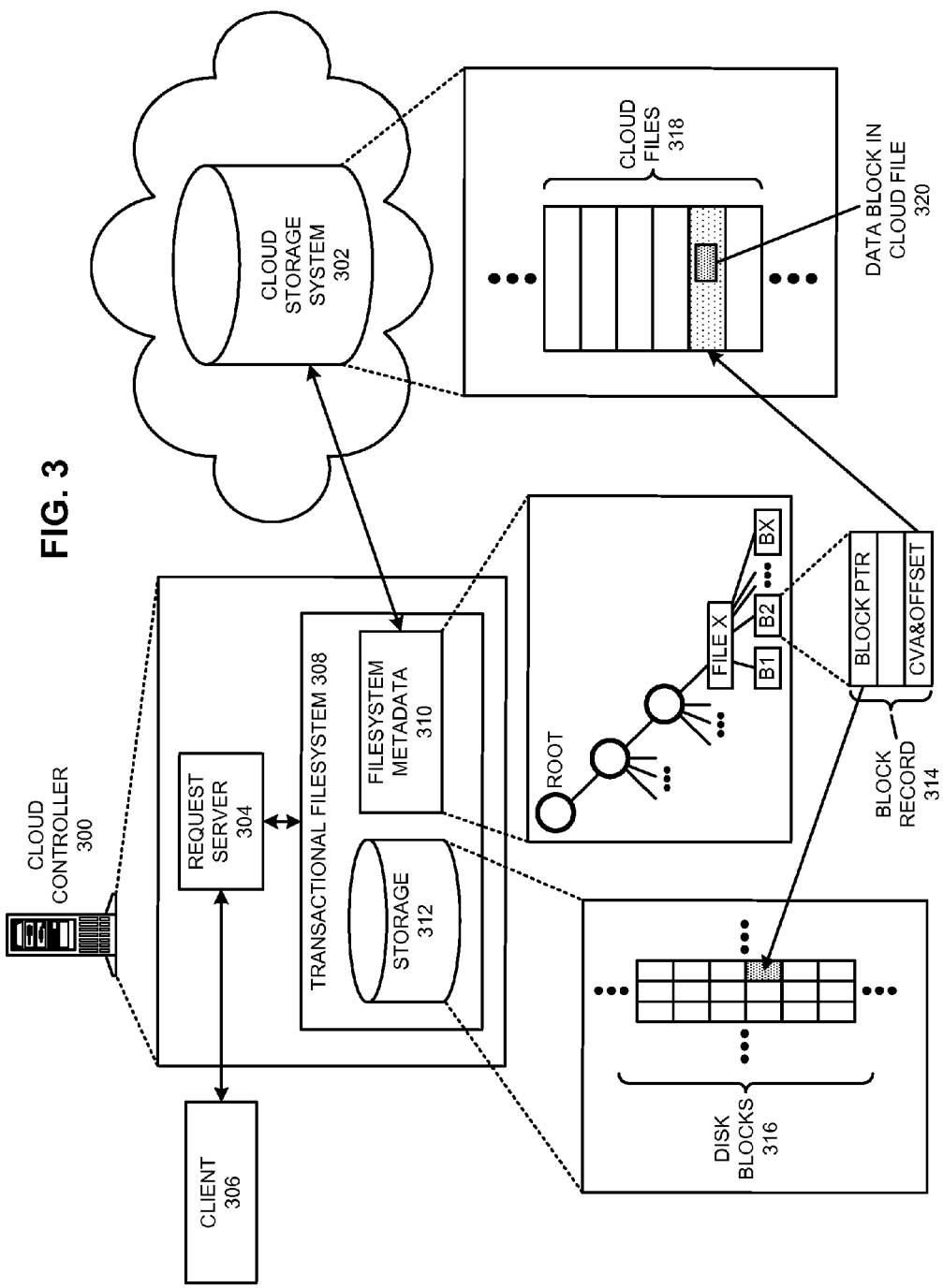
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

In some embodiments, cloud controllers may use stored snapshot data to provide access to different versions of a file. For instance, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In some embodiments, each file in the distributed filesystem is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. Additional techniques for using cloud controller to manage and access data stored in a distributed filesystem are described in more detail in pending U.S. patent application Ser. No. 13/725,767, filed 21 Dec. 2012, entitled "Accessing Cached Data from a Peer Cloud Controller in a Distributed Filesystem," by inventors John Richard Taylor, Randy Yen-pang Chou, and Andrew P. Davis, which is incorporated by reference in its entirety).

Supporting Collaboration in a Distributed Filesystem

The previous sections describe a distributed filesystem in which distributed cloud controllers collectively manage (and provide consistent access to) file data that is stored in a remote cloud storage system. As described, each cloud controller maintains (and updates) a copy of the metadata for the files stored in the distributed filesystem, but only caches a subset of the data stored in the remote cloud storage system that is being accessed (or likely to be accessed) by the respective cloud controller's clients. These cloud controllers use file write locks to ensure that only a single client can write a file at a given time, and then ensure that file modifications are propagated to the remote cloud storage system (e.g., via incremental data snapshots and incremental metadata snapshots).

While the above-described techniques allow metadata and data to be synchronized across a large number of distributed cloud controllers, there may be some delay in propagating snapshots. Such delays may complicate real-time collaboration in scenarios where multiple clients that are distributed across multiple cloud controllers attempt to collaboratively edit and/or access the same files and/or directories. The following sections disclose techniques for reducing delays for collaborative file accesses in a distributed filesystem.

Distributed Change Notification

A distributed filesystem environment presents a range of additional complexities beyond those of a local filesystem environment (e.g., an environment in which a single file server provides file services to several clients). For instance, an individual stand-alone fileserver (also referred to as a "network filer"—e.g., a CIFS fileserver) can support additional client performance optimizations by communicating file state changes and filesystem events back to interested clients (e.g., if one client changes a file, the fileserver can contact other connected clients to notify them of the change), thereby enabling collaborative interactions between clients. In another example, a single local fileserver that supports strong read-after-delete consistency can ensure that when one client deletes a file this change propagates to all other connected clients, thereby ensuring that the deleted file can no longer be read by any client. However, efficiently conveying changes across a distributed filesystem is much more difficult and may involve substantial network traffic and delays, especially as the number of cloud controllers grows.

Figure 6:
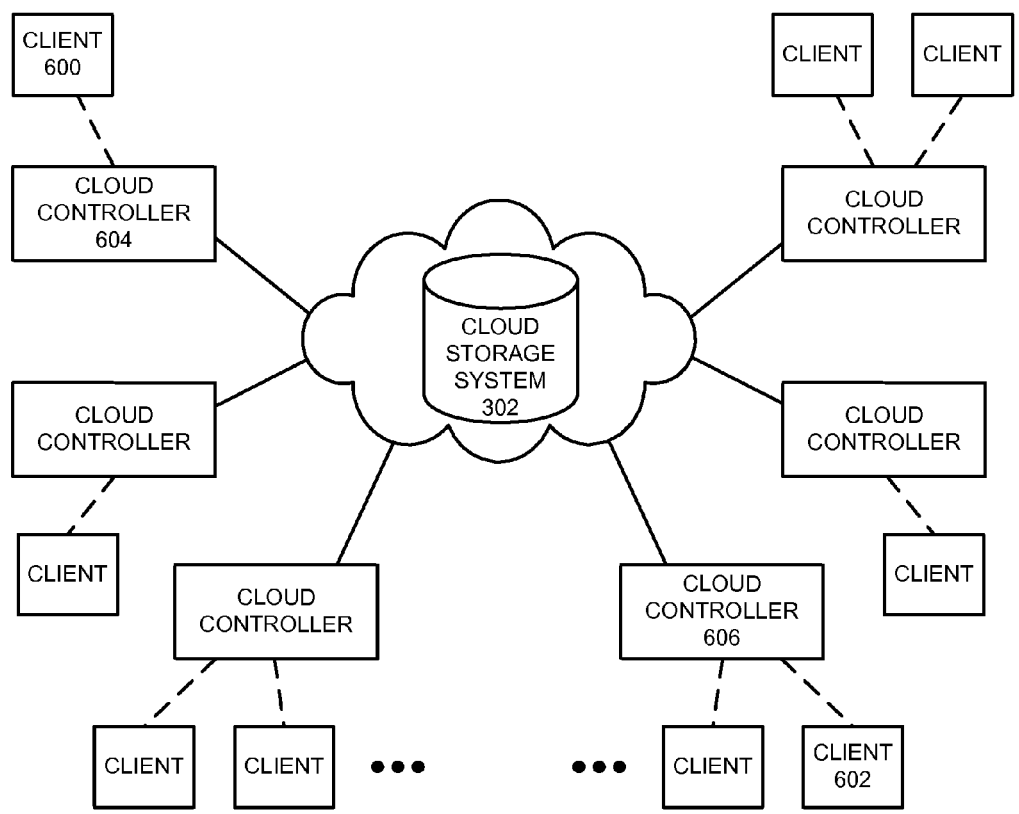
FIG. 6 illustrates a distributed filesystem in which a distributed set of cloud controllers collectively provide file services to a distributed set of clients in accordance with an embodiment.

FIG. 6 illustrates the previously-described distributed filesystem, in which a distributed set of cloud controllers collectively provide file services to a distributed set of clients. Consider a scenario in which a client 600 modifies a file ("file Y"). Client 600's request to perform a write on file Y results in client 600's associated cloud controller (cloud controller 604) acquiring a write lock for file Y from the cloud controller that "owns" file Y. After client 600 finishes writing file Y and closes the file handle, cloud controller 604 writes the changed data to cloud storage system 302 (via an incremental data snapshot) and then communicates any changed metadata to the other cloud controllers (via an incremental metadata snapshot). These cloud controllers update their metadata accordingly, thereby making the modified data available to the other clients of the distributed filesystem. Client requests for the new file data are serviced by downloading the updated data from cloud storage system 302 to each requesting client's associated cloud controller. Such update mechanisms ensure that all of the cloud controllers are updated following changes, and suffice for many non-collaborative situations in which files are being accessed infrequently and/or primarily by a single client.

Consider, however, a scenario in which a user at client 600 and a user at a second, remote client (client 602) take turns at collaboratively modifying file Y; in this scenario, only one client is actually attempting to write the file at a given time, but both clients want to see and respond to the changes made by the other user as soon as possible. Such situations call for "strong read-after-write consistency," which ensures that following a file write subsequent reads or writes will see the updated file contents instead of the previous version of the file. Note that there is no guarantee of read-after-write consistency until a client writing a file has closed the file handle or a subsequent write lock is granted to another client. Thus, a second client attempting to read a file that is still being written can receive stale content. However, once the client application writing a file closes the file, all of the modified data should be flushed to the cloud controller, and another client that subsequently attempts to read the file should see the updated version of the file.

Unfortunately, the time delays associated with sending, receiving, and processing incremental snapshots may prevent strong read-after-write consistency, and hence hinder collaborative work. In some embodiments cloud controllers ensure strong read-after-write consistency (or, more specifically, read-after-close consistency) for files in the distributed filesystem by directly notifying the other cloud controllers in the system when the file handle for each modified file is closed. However, the number of cloud controllers in the distributed filesystem may scale to a large number, and thus sending notifications for all file changes to all of the cloud controllers in the distributed filesystem may involve a substantial number of network messages (and hence substantial network bandwidth and processing overhead). Hence, in some embodiments the set of notifications is reduced by ensuring that notifications only need to be sent to a targeted set of cloud controllers.

In some embodiments, cloud controllers may be configured to send two types of notification messages:
1. Registration notifications, which are used to indicate that a cloud controller is registering to request notification whenever a specified file, directory, and/or portion of the filesystem hierarchy is modified; and
2. Change notifications, which are sent whenever a cloud controller receives from a client a file close request (following a write) that is in the scope of a registered filesystem entity (e.g., a client file close request that follows a write to a file, directory, and/or portion of the filesystem that has been identified in a previous registration notification from another cloud controller).

These two types of messages can be used to reduce the overhead associated with ensuring strong read-after-write consistency. For instance, cloud controllers may be configured to send registration notifications to all of the cloud controllers in the system, after which each cloud controller then only needs to send change notifications for any given file modification to the set of cloud controllers that have registered to receive notifications for that file (and/or portion of the filesystem containing the file).

The manner in which registration and change notifications are used can facilitate reducing the number of notification messages that are sent between the cloud controllers of the distributed filesystem. For instance, in some embodiments tunable parameters for notifications can include: 1) the set of filesystem entities that are being tracked using these mechanisms; 2) the granularity of the tracked filesystem entities that are being registered; and/or 3) one or more time intervals that are associated with registration.

In some embodiments, cloud controllers can be configured to only send registration and change notifications for a subset of the files in the distributed filesystem. For instance, a configuration file (and/or locality policy) may be configured to identify file types and/or file locations (in the filesystem hierarchy) that will need strong read-after-write consistency. For example, these configuration settings may indicate specific file extensions that are likely to involve collaboration and/or file extensions that do not require such consistency (e.g., image and video files). Upon receiving a request from a client to open a file identified to need registration, the cloud controller receiving the request broadcasts a registration notification to all of the other cloud controllers in the system; any other cloud controller receiving a write request from a client for the same file will then send the first cloud controller a change notification.

Note that in some embodiments, cloud controllers may also be configured to dynamically identify files, directories, and sub-hierarchies that would benefit from registration and change notifications. For instance, cloud controllers may detect (e.g., from successive incremental metadata snapshots and/or other tracked access patterns) that multiple clients are attempting to collaboratively edit a set of files, and enable registration and change notification tracking for those files. Cloud controllers may also be configured to use a range of heuristic-based techniques to identify files that would benefit from registration and change notifications. For example, cloud controllers may be configured to scan the contents of files (e.g., instead of only looking at file extensions) and/or use other file characteristics to determine a file's type and expected access behavior. Note that when determining whether to provide collaborative support, false positives are generally preferred over false negatives. Sending registration notifications for a small set of files that do not really need such support primarily involves some additional network message and notification tracking overhead (e.g., note that if no other cloud controllers register interest in the same file, no change notifications need to be sent). In contrast, not providing such support for a file that is being collaboratively accessed can cause substantial client delays, user frustration, and/or potential file inconsistency.

In some embodiments, different granularities of tracked filesystem entities may be used to adjust the amount of notification traffic for the distributed filesystem. For instance, registration notifications may be specified at the granularity of an individual file, a directory (which may contain any number of files), or a sub-hierarchy of the filesystem hierarchy that includes multiple directories. For example, in environments where sets of users commonly collaborate upon specific project directories, a cloud controller may detect that a given client has begun requesting files from a known project directory and thus send a single registration notification for the entire project directory (e.g., based on the premise that the client is quite likely to be interested in all of the files in that directory anyway and that sending a single registration notification for the entire directory has much lower overhead than sending registration notifications for each file in the directory). After sending this registration notification for the directory, the cloud controller then receives change notifications for any files modified in the directory. In another example, some organizations may group files that are likely to be collaboratively edited in a specific portion of the filesystem hierarchy, in which case cloud controllers may be configured to only send a single notification for that entire portion of the hierarchy and then send subsequent change notifications every time any file in that portion of hierarchy is modified. Note that some system implementations may allow the range to granularities to be selected on a per-message basis in each registration notification message, while others may specify a single granularity for the system (e.g., each notification message specifies a directory).

In some embodiments, a range of time intervals may be used to adjust the amount of notification traffic for the distributed filesystem. For instance, clients may only be interested in files for a limited time, and hence registration requests may be configured to expire after a specified time interval. In some implementations the expiration time may be specified on a per-registration-notification basis (e.g., depending on the files being accessed and/or a locality policy), while in other implementations all registration requests may expire after a fixed time interval (e.g., ten minutes after receipt). If a client continues to access a given file and/or directory beyond this time interval, its associated cloud controller can send an additional registration notification to extend the time interval in which it will receive change notifications. Alternatively, if the client is no longer accessing the file, the set of cloud controller note that the registration time interval has expired and purge that specific registration. Additional ("renewal") registration messages are also broadcast to all of the cloud controllers, so an alternate technique may instead involve extending registration time intervals, thereby reducing the number of renewal notification messages.

Note that sending additional registration notifications near or after the expiration of a registration time interval can lead to race conditions that can result in cloud controllers missing change notifications. For instance, in some situations a network delay might cause a subsequent renewal registration notification for the same file to not be received before the expiration of the previous registration for that file. As a result, the cloud controller sending the renewal registration notification might not receive a change notification if that file was changed (via another cloud controller) during that intermediate interval. In some embodiments, such race conditions can be avoided by erring on the side of over-notification and broadcasting registration renewals on a shorter time interval than the registration duration interval (e.g., one minute before the registration duration interval would expire). This "pre-expiration renewal time interval" may be fixed or adjusted based on expected system delays; for instance, cloud controllers may track message delays between individual cloud controllers over time, and then use this information to adjust such time intervals accordingly.

An alternative technique might involve not having registration notifications time out, and instead sending de-registration messages. However, de-registration messages would need to be broadcast to all cloud controllers, and hence may be unreliable and result in a higher message cost on a system-wide basis.

The above-described techniques assume that at any given time the number of clients (and cloud controllers) that are accessing a given directory is likely to be much fewer than the total number of clients and cloud controllers (even if the distributed filesystem includes a large number of cloud controllers). In such environments, multicasting change notifications to a limited subset of cloud controllers (instead of broadcasting to all of the cloud controllers) provides strong read-after-write consistency while reducing the amount of associated message traffic. As described above, reducing the number of files that are tracked and selecting an appropriate registration granularity and time interval can further reduce message traffic and system overheads. For instance, time intervals can be selected such that the frequency of change notifications is much higher than the frequency of registration notifications, thereby reducing the number of broadcast messages that need to be sent to all of the cloud controllers.

Note that change-notification techniques are independent of and separate from incremental metadata and data updates. The described change-notify techniques are real-time notifications that are sent to ensure that any interested cloud controller node can receive modifications to a registered file immediately instead of (with some delay) via the normal incremental metadata updates. More specifically, a change notification message can be used to identify the cloud controller that is caching the most recent version of the registered file. For instance, a cloud controller may cache change notify information until it receives a normal incremental metadata snapshot that describes the same change (at which point the metadata for the file is updated to reflect the recent changes and the current owner, and the cached change notification can be discarded). During the intermediate time interval, however, if a client requests access to this (registered) file, the cloud controller can use the information from the change notification to directly contact that hosting cloud controller and immediately synchronize the modified file data (instead of waiting for the incremental metadata snapshot that describes the change to arrive), thereby bypassing the normal update mechanisms and presenting the updated file contents to the client as quickly as possible; such retrievals are described in more detail in a subsequent section. Note that if multiple change notifications are received for the same file, a cloud controller will typically only preserve the most recent set of changes (thereby ensuring that it can contact the most recent owner to synchronize the file changes if needed).

Note also that the above-described distributed-change-notify techniques are not tied to any particular file or network filesystem protocol, but can instead be applied generally to efficiently communicate file state in any distributed filesystem, thereby allowing clients to be updated when files change in different geographic locations.

Figure 7:
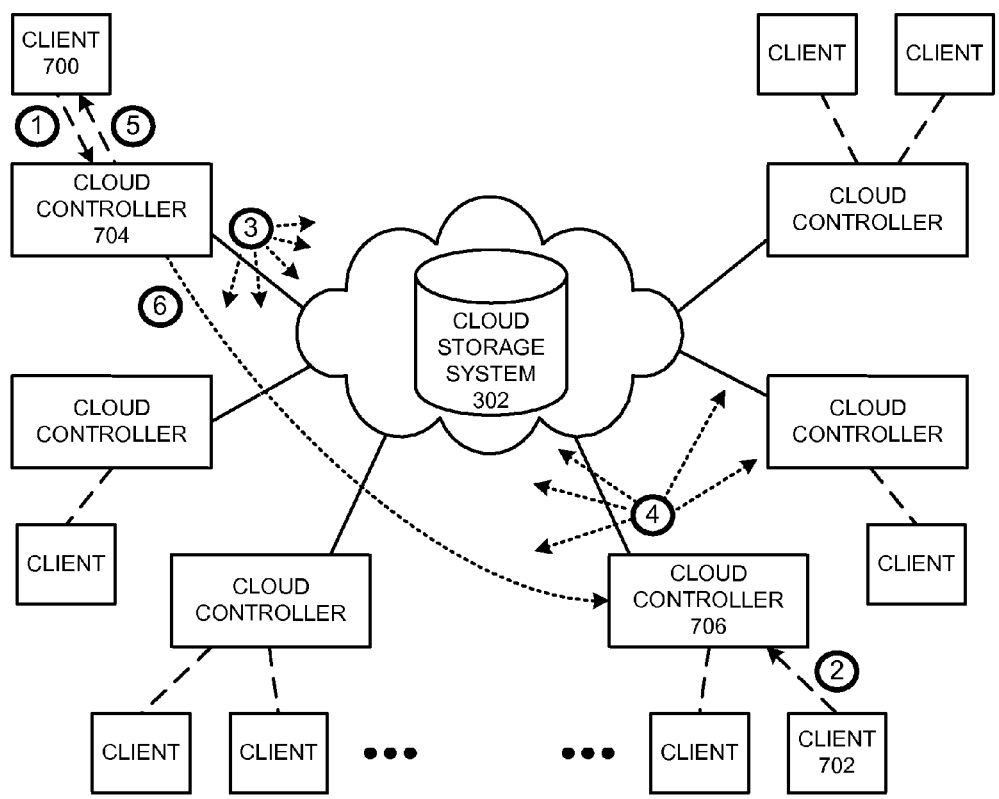
FIG. 7 illustrates a scenario in which distributed-change-notify techniques are used to support collaboration between clients in accordance with an embodiment.

FIG. 7 illustrates a scenario in which distributed-change-notify techniques are used to support collaboration between clients 700 and 702. For instance, consider a situation in which the users associated with these two clients both want to collaboratively modify a file, "file Z," in the same project directory, and that this project directory has been previously flagged as a directory that needs additional collaboration support. As each of the two clients (700 and 702) send requests to read file Z (operations 1 and 2, respectively), their respective cloud controllers (704 and 706) detect that this directory needs the additional collaboration support, and each sends out a registration notification (operations 3 and 4, respectively, in FIG. 7) to all of the other cloud controllers in the distributed filesystem to indicate that those cloud controllers would like to receive change notifications for any changes in this directory for a specified time interval (e.g., the next ten minutes). All of the cloud controllers take note of this registration and track subsequent client file writes to determine if corresponding change notifications need to be sent Subsequently, client 700 sends cloud controller 704 a request to open file Z for writing. Cloud controller 704 requests and receives a write lock for file Z (e.g., by negotiating with the cloud controller that "owns" file Z), and grants the write permission to client 700. While client 700 is writing new data to file Z (but has not yet closed the file), other clients reading the file will still access the previous version of the file. When client 700 completes writing changes to file Z to cloud controller 704 and closes the file handle (operation 5), cloud controller 704 checks and determines that file Z (and/or its parent directory) has active registrations, and sends out change notification messages to every cloud controller with an active (un-expired) registration that encompasses file Z (including, in this case, cloud controller 706, as indicated by operation 6). Cloud controller 706 receives the change notification, and can then immediately retrieve the latest metadata and data for file Z from cloud controller 704 for subsequent accesses by client 702, thereby providing strong read-after-write consistency for file Z. Cloud controller 704 also subsequently sends an incremental data snapshot that includes the file changes to cloud storage system 302 (not shown) and then sends an incremental metadata snapshot to the other cloud controllers to notify them of the updated file; thus, other cloud controllers that had not sent registration notifications for file Z (and/or file Z's parent directory) will also eventually be notified of the changes for file Z via the incremental metadata snapshots and can then access the updated file data via cloud storage system 302.

Note that in some embodiments, the operations performed by each cloud controller to support distributed-change-notify capabilities may include: 1) receiving and processing registration notifications to maintain a table of tracked files/directories and their expiration times; 2) tracking the time of its own previously-sent registration notifications and client activity to determine if and/or when renewal registration notifications need to be sent; 3) determining whether a write request received from a client is covered by any of the tracked, unexpired registration notifications and needs a change notification to be sent; and 4) receiving and processing change notifications from other cloud controllers;

In some embodiments, cloud controllers may also be configured to send change notification messages for namespace operations (e.g., when a file is created, deleted, or renamed) in addition to data operations (such as file writes). Strong namespace consistency can improve the performance of applications that collaborate across controllers. For instance, a cloud controller that sends a registration notification for a directory would now also be notified of any namespace changes in that directory, and thus would be able to provide additional capabilities and/or guarantees for the distributed filesystem (e.g., strong read-after-delete consistency). Without change notifications for namespace operations, applications would otherwise need to wait for such file namespace updates to arrive via the normal incremental metadata snapshots, which might significantly delay any application actions that are triggered by such namespace events.

Figure 8:
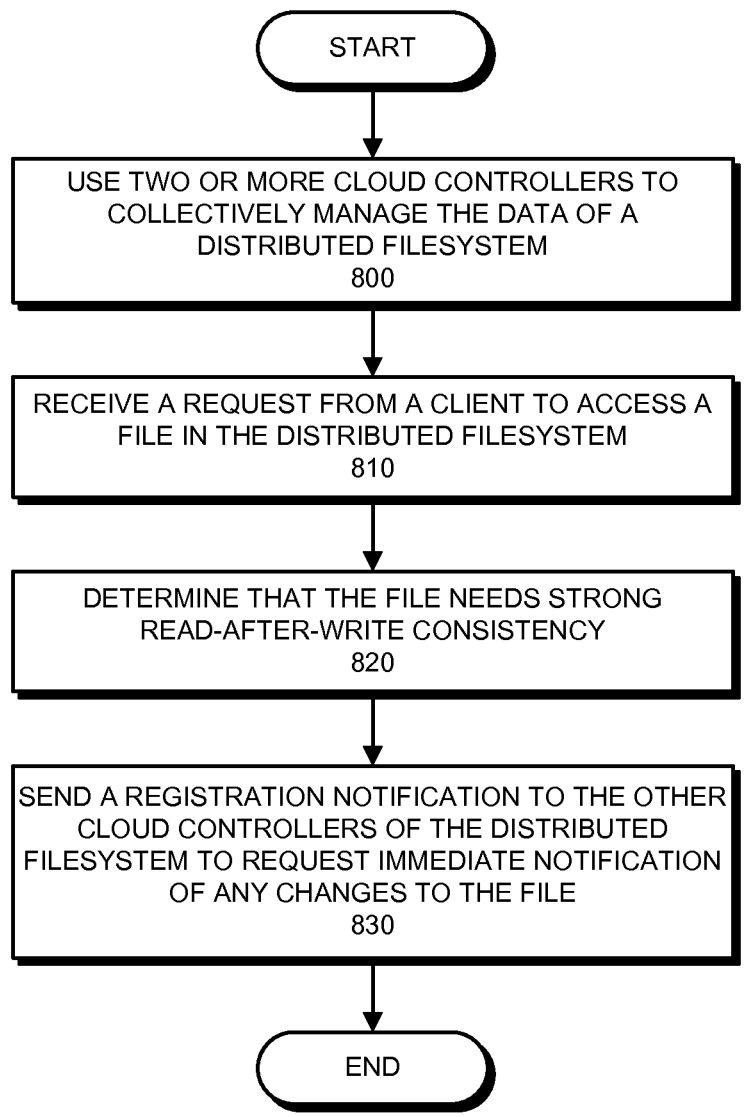
FIG. 8 presents a flow chart that illustrates the process of registering to receive distributed change notifications for a distributed filesystem in accordance with an embodiment.

FIG. 8 presents a flow chart that illustrates the process of registering to receive distributed change notifications for a distributed filesystem. Two or more cloud controllers collectively manage the distributed filesystem data that is stored in one or more cloud storage systems (operation 800); the cloud controllers cache and ensure data consistency for the stored data. During operation, a cloud controller receives a request from a client to access a file in the distributed filesystem (operation 810). The cloud controller determines that the file needs strong read-after write consistency (operation 820) and sends a registration notification to the other cloud controllers of the distributed filesystem to request immediate notification of any changes to the file (operation 830). The other cloud controllers track received registration notification requests, and another cloud controller receiving a subsequent client file write and close request for the same file will, based on the previous registration request, send a change notification to the first cloud controller.

In summary, cloud controllers can leverage change notification techniques to improve distributed collaboration for files in the distributed filesystem. Files changes that do not need strong consistency can be propagated "lazily" via incremental metadata snapshots, while files that need stronger consistency are registered and are supported by immediate change notifications. This arrangement allows controllers to prioritize precious inter-cloud-controller bandwidth for time-critical updates. The set of high-priority files that are subject to distributed change notification and synchronization can be configured and/or tuned based on client needs and on the amount of cloud controller and network bandwidth available.

Managing Client Caching in a Distributed Filesystem

In some filesystem environments client-fileserver interactions may be further adjusted to optimize performance. For instance, file operations that are initiated by applications that execute on a client device (also frequently referred to simply as "a client") are typically implemented as individual logical actions, and may not consider whether the application is operating upon a local or remote file. For example, a normal flow of operation for an application executing on the client may involve opening a file to perform a read, closing the file, re-opening the same file to get additional information, closing the file again, re-opening the same file to perform a write, etc. From the context of an application writer this is a reasonable course of action, but file operations often involve substantial compute overhead and delay (especially when they access a separate fileserver via a network connection), and hence such a string of operations may result in sub-optimal application performance.

In some fileserver implementations, client devices access a remote fileserver (e.g., a CIFS fileserver) by locally executing a local "filesystem client" application (in CIFS and similar protocols, this is sometimes referred to as a "windows filesystem client") that enables some additional file access capabilities. For instance, the windows filesystem client may facilitate improved client file access performance by providing a range of client caching options that can be requested when initiating file operations. More specifically, application file access requests are forwarded to this windows filesystem client, which then submits associated requests to the remote fileserver. When responding to such requests, a fileserver may consider the number of clients accessing the requested file and the type of client accesses to determine which capabilities will actually be granted to a requesting client. For example, in the CIFS protocol a windows filesystem client opening a file can request a range of opportunistic locking capabilities (or "oplocks") from the fileserver that influence how files can be locally cached on the client. More specifically, in CIFS the oplock levels include:

Batch locks: batch locks are granted by a fileserver when a client requesting to open or create a file is likely to be the only client accessing the requested file, and allow that client (specifically, the windows filesystem client executing on the client) to cache the file handle granted by the fileserver for an additional client-chosen time interval even after the application on the client that is accessing the file has closed the file handle. During that time interval the file handle remains valid and can be re-opened and used again by the application without any additional overhead; e.g., the file handle has not been closed on the fileserver or in the windows filesystem client, and hence can still be used as a valid file handle by the application without having to send another open request to the fileserver.

Exclusive locks: as with batch locks, exclusive locks are typically requested and granted in situations in which the requesting client is likely to be the only client accessing the requested file. For instance, an application may specify that it wants exclusive access to a file via a "sharing mode" parameter (e.g., specifying that it does not want access to the file to be shared). In this case, this request is received by the windows filesystem client and conveyed to the fileserver, and if no other clients or processes are accessing the file, the fileserver can grant the client exclusive access to the file and allow the client to cache changes to the file locally prior to writing the changes through to the fileserver. More specifically, the windows filesystem client on the client can locally cache the read file data and buffer any new data written to the file until the application closes the file handle or performs an explicit file flush operation, at which time the windows filesystem client needs to flush all changes to the fileserver. Note that such buffered data may be lost if the application or client crash or otherwise fail; the decision to use buffered writes is a performance optimization that is specifically chosen at the application level (e.g., by the application developer) as an optimization that eliminates additional communication overhead with the fileserver at the risk of potentially losing the buffered write data. Hence, an application performing critical operations (e.g., financial transactions) that need to be immediately persistent on the fileserver would instead typically ensure that every write is immediately flushed to the fileserver. Exclusive locks can improve the performance of applications by eliminating communication latency to the fileserver when strong write guarantees are not needed. While one client has an exclusive (or batch) lock, no other clients can write the file.

Level 2 locks: level 2 locks allow clients to buffer reads but not buffer writes. Such locks are typically used when multiple clients are reading a file at the same time; each client can cache the file for read purposes, but every write has to pass through to the fileserver immediately, thereby allowing the fileserver to update the other clients and provide strong read-after-write consistency.

None (no locks): when multiple clients and/or applications are actively collaborating on the same file, the fileserver may choose to grant no locks, thereby blocking client caching and forcing every read or write request to be sent to the fileserver. This option provides consistency but results in substantially more network messages and higher file access latencies.

Some protocols also include the notion of "oplock breaks" (e.g., an "opportunistic lock break notification") that a fileserver can send to a client to revoke a previous lock. A windows filesystem client may be configured to always request a lock where possible, and a fileserver may be configured to usually grant a batch or exclusive lock if a requesting client is the only client accessing the requested file; if this is the case, the requesting windows filesystem client is typically granted the requested lock and can cache the file and buffer writes and/or file handles as desired. However, if additional client devices (or additional application processes on the same device) subsequently attempt to access the same file, the fileserver may need to recall these privileges. For instance, if a second client device sends a request to open the same file that the initial client has an exclusive lock on, the fileserver can send an oplock break message to the first client device to invalidate the exclusive lock; upon receiving the oplock break, the windows filesystem client on the initial client flushes any modified data back to the fileserver and sends an oplock break acknowledgement (Note that if the client application was in the middle of a write and/or still has the file handle open, the windows filesystem client can still flush all buffered data for the file to the server and acknowledge the oplock break; subsequent written data will be sent on to the fileserver directly instead of being buffered on the client). At this point, all of the file's data on the fileserver is current, and the fileserver may then adjust the lock status for both clients depending on the second client's requested access and then grant the second client's file open request. For example, if both clients want to read the file, the fileserver may then give both clients a level 2 lock for the file thereby allowing both clients to buffer reads. Alternatively, if one or both clients request write access, the fileserver may need to specify no locking for the file to ensure that all read and write requests access the fileserver (and thus are certain to not access stale data). Note that while the above oplock levels and oplock break capabilities are described in the context of the CIFS protocol, the techniques described in this disclosure are applicable to any network/distributed filesystem file protocol, including (but not limited to) CIFS, SMB2, SMB3, NFSv4, and pNFS.

In general, such techniques can substantially improve the performance of client file accesses by enabling client caching in certain situations. However, as described previously, in the above-described examples the fileservers are single stand-alone fileservers, and the described fileserver capabilities do not extend to a distributed filesystem in which multiple geographically-distributed cloud controllers cooperate to provide file services to their clients. In the disclosed distributed system (also as described previously), multiple cloud controllers provide their associated clients with the abstraction of a single fileserver, but then interact behind the scenes to manage updates and ensure consistency for the distributed filesystem. In order to improve client performance, each individual cloud controller would ideally provide substantially similar opportunistic lock protocols that enable its set of local clients to perform client file caching when possible. However, ensuring consistency across the entire set of cloud controllers involves an additional level of communication and coordination between the cloud controllers.

Consider, for instance, a situation in which cloud controllers support batch locks, and a client of a cloud controller requests and is granted a batch lock for a file; this client can now keep the file handle for the file open as long as desired. In situations where only this one client is accessing the file this is not an issue, but a second client trying to write the same file via a second cloud controller might encounter a sharing violation. More specifically, as described above, in the distributed filesystem only one writer is allowed for a file at a given time, so when the second cloud controller contacts the cloud controller that owns the file to request a write lock, the owning cloud controller will determine that the first cloud controller already holds the write lock for the file (which the first client still has open). However, in the absence of any mechanism that allows the owning cloud controller or the second cloud controller to indicate to the first cloud controller that another client is waiting to access the files, the second client is blocked from accessing the file (at least without potential consistency violations) until: (1) the application on the first client that is writing the file closes the file; and then (2) the filesystem client on the first client closes the file handle (thereby releasing the batch lock). Note that the filesystem client might continue caching the file handle, and hence not close the file handle until long after the application has closed the file; such issues can result in poor file access performance and substantial difficulty for multiple distributed clients attempting to collaboratively modify a file in real-time.

Consider an alternative situation in which cloud controllers instead denied opportunistic lock requests (e.g., effectively setting oplock level none for all files and forcing all client read and write requests to query their associated cloud controller). In this scenario, a client would no longer need to wait indefinitely for another client with a batch lock on a requested file, but every file operation would involve contacting a cloud controller, thereby potentially increasing each cloud controller's load as well as client file access latencies. Another alternative might attempt to allow opportunistic lock requests for "normal" files (e.g., files not likely to be accessed simultaneously by multiple clients) while denying opportunistic lock requests for files which are known to need strong read-after-write consistency. Unfortunately, distinguishing the two types of files may sometimes be difficult, and hence such attempts may still result in clients sometimes being blocked from accessing a requested file for a potentially long time interval.

In some embodiments, cloud controllers are extended to support "distributed oplock" capabilities that allow cloud controllers to grant opportunistic lock requests and also allow remote cloud controllers to initiate the revocation of opportunistic client locks. Distributed oplocks allow each cloud controller to provide locking capabilities that facilitate client caching for files stored in the distributed filesystem while also providing the capability to revoke client locks as needed when clients attempt to collaboratively edit files. For instance, upon receiving a client file access request cloud controllers may consider the type of file access and lock that is being requested in the context of the existing set of permissions and locks that have already been granted to other clients for the same file and then, if they conflict, either revoke existing locks or refuse the pending request.

In some embodiments, two cloud controllers consider the file access types and sharing modes that are requested by (and/or granted to) clients to determine whether to initiate an oplock break and whether to grant or deny a requested file handle and opportunistic lock for the file. For instance, a first cloud controller receiving a request from a client for a file that is known to need strong read-after-write consistency may initiate a claim operation for the file. The actual client request indicates the type of access being requested (e.g., read, write, or both read and write) as well as a requested sharing mode for the file (e.g., whether the client needs exclusive non-sharing access or shared access would be acceptable). In a claim operation, the first cloud controller sends the request information to the cloud controller that owns the file, and the owning cloud controller checks whether any other clients currently have the file open (and hold any opportunistic locks). For example, the owning cloud controller can perform a sharing access check to compare the requested access type and sharing mode for the incoming request against the corresponding characteristics of the file handles held by the other client(s). If there are sharing conflicts, the owning cloud controller may then send an oplock break to clients with existing write handles (to flush all completed file writes to the cloud controller) and then perform a second sharing access check to determine if there is still a sharing conflict. If the initial sharing access check indicates no conflict, the owning cloud controller may allow multiple clients to simultaneously hold opportunistic locks. In general, the owning cloud controller uses such comparisons to ensure file consistency and to determine how to handle incoming requests; several exemplary scenarios are described below. Note that (successful) claim operations typically transfer ownership of a file to the requesting cloud controller. However, some file access requests may not require a claim operation (e.g., may not need to transfer ownership); for instance, a client read request may not require a change of ownership, but may still involve performing a sharing access check on the owning cloud controller (which may as a result send oplock break requests to other clients).

In some embodiments, an owning cloud controller may skip the initial sharing access check when there is already an outstanding file handle open for the same file, instead proceeding directly to breaking the outstanding opportunistic lock. Skipping the initial sharing access check when there is already an existing file handle open is often an optimization, because (depending on the type of outstanding file handle and the request) the opportunistic lock may need to be broken whether there is a sharing violation or not (e.g., to flush buffered write data); the need for an oplock break is not indicative of a sharing violation. In such situations the first sharing violation check is moot anyway, and can be skipped (e.g., the second sharing violation after the oplock break can determine whether the pending file access request can be granted or not). For example, when an existing file handle allows write access with shared read, and an incoming file access request is for read access with shared write, an initial sharing access check would be successful but an oplock break would still be needed to signal to the client holding the file handle to flush any buffered data (thereby allowing the read request to access the most up-to-date file data). Hence, for simplicity, an owning cloud controller may be configured to break an oplock regardless of whether there is a sharing violation or not unless there is some other mitigating exception that makes the oplock break unnecessary (e.g., when the outstanding file handle is for read-only access).

Note that contacting the cloud controller that is managing access to a file may take several network hops. For instance, in some configurations the requesting cloud controller may first contact the cloud controller that owns the namespace that contains the file (referred to as "the lessor"). However, in some implementations namespace management may change infrequently but actual "ownership" (e.g., the identity of the cloud controller that actually manages the file access for a given file) may be dynamic and change frequently based on the set of clients that are writing the file (techniques for managing a global namespace for a distributed filesystem are are described in more detail in pending U.S. patent application Ser. No. 14/020,493, filed 6 Sep. 2013, entitled "Managing a Global Namespace for a Distributed Filesystem," by inventors Andrew P. Davis, Richard Sharpe, and Allan Burrington, which is incorporated by reference in its entirety). In such implementations, the lessor may be configured to track the current owning cloud controller, and can forward the request appropriately (e.g., resulting in at most two hops from the requesting cloud controller to the owning cloud controller).

Figure 9:
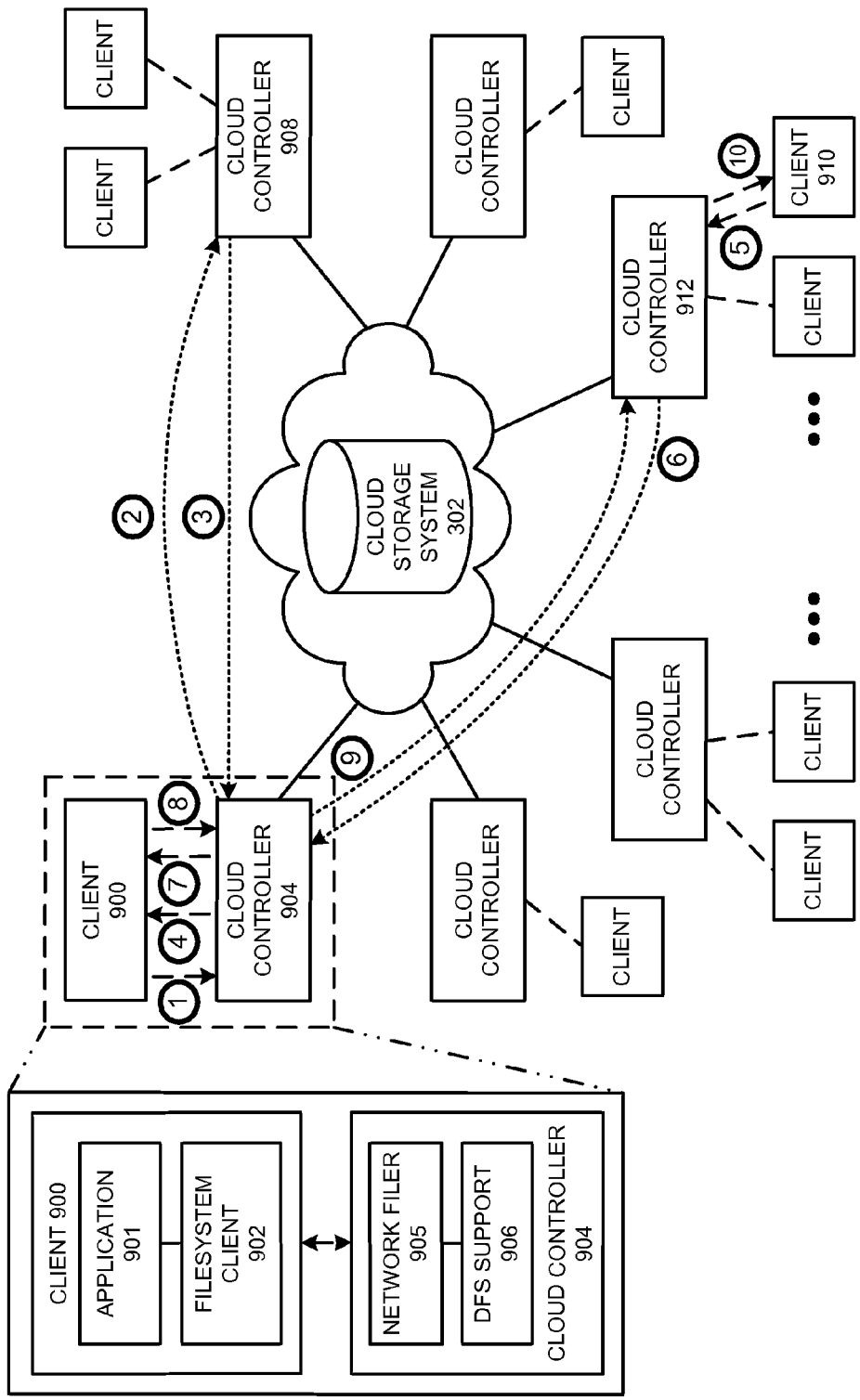
FIG. 9 illustrates the exemplary use of a distributed oplock break in a distributed filesystem in accordance with an embodiment.

FIG. 9 illustrates the exemplary use of a distributed oplock break in a distributed filesystem. An application 901 executing on client 900 attempts to open a file for writing, resulting in a file open request being sent to a filesystem client 902 that is also executing on client 900. Filesystem client 902 sends an open request for exclusive write access of file Z to its associated cloud controller 904, and in the process requests an opportunistic lock (e.g., a batch or exclusive lock) (operation 1). In response, cloud controller 904 performs a lookup in its local copy of the distributed filesystem's metadata to determine which cloud controller owns the namespace containing file Z, determines that cloud controller 908 is the lessor, and contacts cloud controller 908 to initiate a "claim operation" (e.g., either to request a file write handle via GRW or, in this scenario, to request ownership of file Z) (operation 2). In this example, cloud controller 908 is both the lessor and owning cloud controller for file Z, and: (1) determines that no other cloud controllers currently are accessing or holding a write lock for file Z; and (2) transfers ownership for file Z to cloud controller 904 (operation 3), which then grants the exclusive lock for file Z to client 900 (operation 4). At this point, client 900 is able to cache file Z and perform buffered writes. Note that cloud controller 904 also identifies file Z as a file that needs additional collaboration capabilities (as in the example of FIG. 7), and thus sends a registration notification message for file Z to all of the other cloud controllers (not shown) as well as an incremental metadata snapshot that indicates that it is now the owner of file Z.

Subsequently, a second client 910 requests a file handle for file Z from its associated cloud controller 912 (operation 5). In response, cloud controller 912 broadcasts a registration notification message for file Z and performs a lookup in its local copy of the distributed filesystem's metadata to determine the lessor and/or owner for file Z. If sufficient time has passed since the incremental metadata snapshot, the local metadata will have been updated to indicate that cloud controller 904 is the new owner of file Z (operation 6); otherwise, the lessor, cloud controller 908, can either forward the request to the current owner, cloud controller 904 (operation not shown), or inform cloud controller 912 of the ownership change, thereby allowing cloud controller to re-submit the request to cloud controller 904 (operation not shown). Cloud controller 904, upon receiving the file handle request, determines that client 900 currently holds the opportunistic lock for file Z, and sends an oplock break to client 900 (operation 7).

At this point, a number of different outcomes may occur depending on the file write status of file Z on client 900 and the type of request made by client 910. More specifically, the outcome depends on whether client 900 is done writing file Z and the characteristics of client 910's request. For instance, possible scenarios might include:

client 900 is still in the process of actively writing the file: in this case, client 900 flushes all buffered writes and acknowledges the oplock break, but indicates its current writing status to cloud controller 904 (operation 8). Cloud controller 904 determines that the file handle is still open, and the sharing access check indicates that client 900's current exclusive write access precludes all other file access requests (e.g., the sharing access check fails), and notifies cloud controller 912 that file Z is not currently available. Cloud controller 912 indicates this status to client 910 (operation 10) (e.g., by signaling a sharing violation).

client 900 is done writing file Z and was purely buffering writes for a subsequent interval: in this case, client 900 is done accessing the file but is still considered to be accessing the file by cloud controller 904, and hence would (if not for the oplock break) result in an unnecessary sharing conflict for the incoming request during the sharing access check. However, when client 900 flushes all buffered writes for file Z to cloud controller 904 in response to the oplock break, it closes the file handle and relinquishes the batch lock (operation 8). At this point cloud controller 904 sends a change notification for file Z to all interested parties (including cloud controller 912) and, after determining in the sharing access check that there are no other clients accessing the file, can grant ownership of file Z to cloud controller 912 (operation 9), which can then request the most recent file changes from cloud controller 904 and grant client 910 whatever access and opportunistic lock status that was requested (operation 10).

Note that in the second scenario remote cloud controllers, upon receiving a change notify for the modified file, will typically also send an oplock break for the change file to any of their own local clients that have a file handle open for that file. This forces such clients to close the file and subsequently reload the file (and its modified file data) upon the next access, thereby ensuring that changes are synchronized and guaranteeing strong read-after-write (or more specifically, read-after-close) consistency. Thus, distributed oplock breaks may be used both in response to client file access requests (e.g., in conjunction with a sharing access check across cloud controllers) as well as in response to client file modifications (e.g., in response to a change notification). In general, sharing access checks may indicate a number of situations in which simultaneous client accesses would not result in sharing violations, and can be allowed. Consider another example of cloud controller interactions during a shared mode check (in the context of FIG. 9) in which client 900 still requests write access for file Z but allows shared access (e.g., indicates shared read access is permissible instead of requesting exclusive access), and client 910 subsequently requests read access with allowed shared read/write access. In this case, the sharing access check performed by cloud controller 904 would indicate that there was no sharing violation for file Z (e.g., the two access types and sharing modes of the existing file handle and incoming request are compatible). Cloud controller 904 would still send an oplock break to client 900 to ensure that all changes were flushed (operation 8) (and cloud controller 904 as a result still sends a change notification for file Z to all interested parties). However, because there are no sharing violations, cloud controllers 904 and 912 can grant clients 900 and 910 level 2 locks for file Z. Ownership of file Z remains with cloud controller 904 (because only client 900 is performing writes), and cloud controller 904 sends change notifications to all interested cloud controllers every time file Z is closed after being written to ensure that cloud controller 912 can provide client 910 with the latest contents of file Z (operations 9 & 10) whenever any changes occur. Note that this scenario still needs the initial oplock break because client 900 could be buffering writes, and strong read-after-write consistency guarantees require that client 910 not receive obsolete data. Note also that if the incoming request from client 910 requested exclusive read access (instead of read access that allows shared read/write access) that the two requests would be incompatible (even though the existing file handle held by client 900 allows shared read access), and would result in client 910 receiving a sharing violation.

Note that FIG. 9 also illustrates an embodiment of a cloud controller that supports both local and distributed oplocks. More specifically, cloud controller 904 can include both aspects of a local network filer 905 (e.g., a CIFS server) that can manage opportunistic locking for a local set of clients as well as additional distributed filesystem (DFS) support capabilities 906 that support distributed operations and distributed opportunistic lock management. For instance, if multiple clients of cloud controller 904 are attempting to operate upon a file (and are the only clients in the distributed filesystem that are currently accessing that file), the DFS support capabilities 906 can acquire the write lock for that file, and then allow network filer 905 to manage the clients' accesses in a manner substantially similar to a stand-alone fileserver. If, however, remote clients are also attempting to access the same file, DFS support capabilities 906 on the involved cloud controllers can interact to arbitrate (or disable) distributed opportunistic locking and file buffering.

In some embodiments, cloud controllers can be configured to grant multiple distributed clients batch locks for the same file if all of the distributed clients are reading the file (e.g., if no clients are currently writing the file, and a sharing access check indicates that all of the client read requests that are involved allow shared read access). Note that such behavior is an improvement over how opportunistic batch locks typically are implemented for single fileservers, where a first client that has already been granted a batch lock would typically have that batch lock revoked (e.g., receive an oplock break) if a second client requested a batch lock for the same file. If, however, clients are only reading the file, granting batch oplocks to multiple clients enables a "loosely-coupled oplock" that allows all of the clients to cache the file data and perform buffered file reads, thereby reducing file access overhead and latencies. Such read caching can continue until another client receives write access, writes the file, and then closes the file. Previous to that file close, other clients reading the cached version of the file are still considered to be accessing the most recent version. However, after the other client writes and closes the file, read-after-write (or more specifically, read-after-close) consistency requires that the cached file data on the other clients be invalidated and/or updated. In some implementations the cached file data could also already be invalidated when another client receives the write lock (e.g., via a distributed opportunistic lock break notification that is sent to all clients currently caching file data for the file), but for many applications strong read-after-close consistency is sufficient. Similarly, most applications can tolerate an unavoidable consistency delay that occurs between the moment that the cloud controller receives the final file close request (following a write to the file) and the other clients caching the file receive oplock break notifications and invalidate the cached file data (e.g., the time delay due to the time associated with sending a corresponding change notification to the other registered cloud controllers and for those cloud controllers to send corresponding oplock break notifications to any affected clients). Such delays are typically unavoidable in distributed systems; applications that require stronger consistency guarantees might need to use stronger locking techniques (e.g., byte-range locks, which are discussed in subsequent sections) or (in the worst case) might not be able to execute in a distributed environment at all.

In some embodiments cloud controllers are not be configured to support concurrent writes, and hence may enforce that only one client may be able to write the file at a time. In such configurations, ownership of a file (e.g., file Z in FIG. 9) might then shift back and forth between cloud controllers depending on which client is currently performing a write, with change notifications being sent to all interested cloud controllers every time the file is written to ensure that each interested cloud controller receives the changes (and can update its respective clients) as quickly as possible. In alternative embodiments, cloud controllers may be configured to support concurrent writes. For instance, cloud controllers may use byte-range locking techniques (described in subsequent sections) to allow clients to simultaneously modify different parts of the file. A more detailed concurrent write scenario is described in a subsequent section.

In some embodiments cloud controllers may be configured to relax strict file semantics to improve performance. For instance, performing sharing access checks on the owning cloud controller every time files are opened to read or write data can add substantial network traffic and latency. Cloud controller and file access performance can in some scenarios be boosted without substantial drawbacks by bypassing such checks for situations that are not likely to involve collisions. For example, cloud controllers might be configured to not send a request to the owning cloud controller for a file (e.g., not initiate a sharing access check) when receiving a client request for a shared read (e.g., a situation that might otherwise raise a sharing violation if strict checks were enforced and there existed an open handle with either exclusive-read or write-without-read-sharing access on the owning cloud controller). Cloud controllers may also be configured to decide whether to send requests (and initiate sharing access checks) based on a range of configuration options (e.g., based on the file type, collaborative status, file access history and/or frequency, etc).

Figure 10:
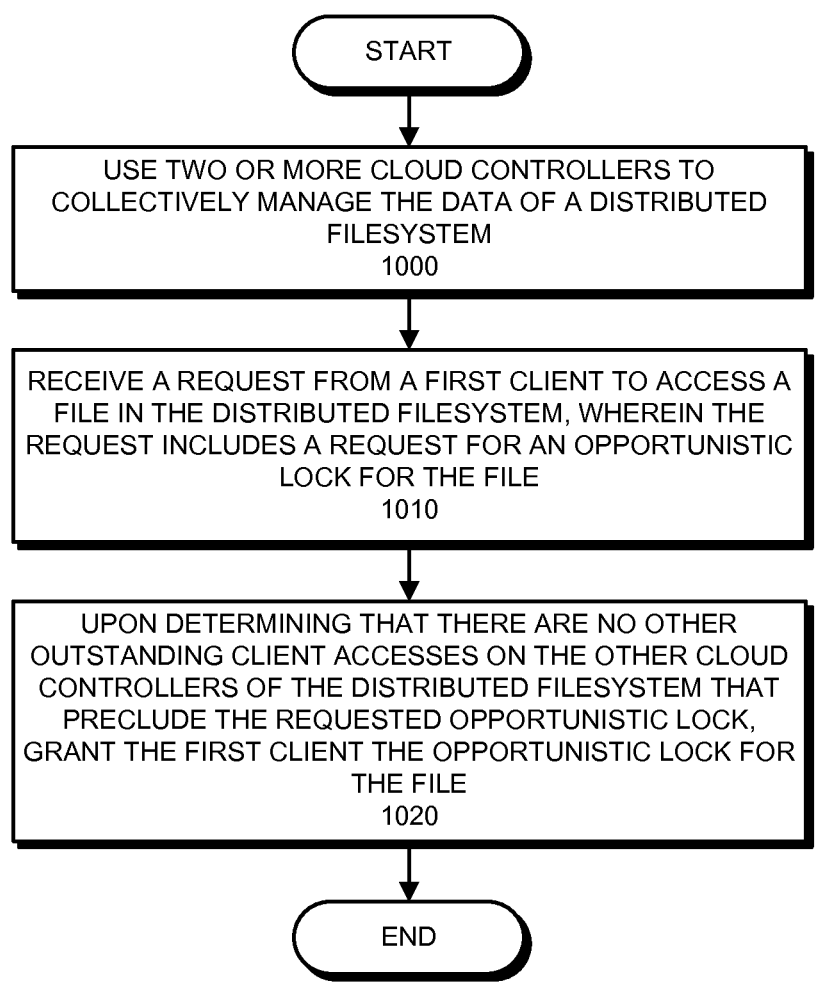
FIG. 10 presents a flow chart that illustrates the process of managing client caching for a distributed filesystem in accordance with an embodiment.

FIG. 10 presents a flow chart that illustrates the process of managing opportunistic locks in a distributed filesystem. Two or more cloud controllers collectively manage the distributed filesystem data that is stored in one or more cloud storage systems (operation 1000); the cloud controllers cache and ensure data consistency for the stored data. During operation, a client sending a request to access a file from a cloud controller also requests an opportunistic lock for the file (operation 1010). If there are no other outstanding client accesses on the other cloud controllers that preclude the requested opportunistic lock, the cloud controller grants the client file access and the opportunistic lock (operation 1020).

In summary, the described distributed oplock break techniques extend cloud controllers to enable clients of a distributed filesystem to lock files and perform buffered writes. The distributed cloud controllers work together to collectively grant locks as requested (where possible), revoke locks as needed, and propagate file changes to their clients, thereby transparently providing the abstraction of a single local fileserver to clients while maintaining strong read-after-write consistency (when needed) for a distributed filesystem.

Synchronization Updates Between Cloud Controllers

As described previously, updates to most of the files in the distributed filesystem can be propagated via lazy update techniques; e.g., large, incremental metadata snapshots that are periodically propagated to all cloud controllers to indicate changed data that can now be accessed via the cloud storage system. However, as described above, collaborative work may involve finer-grain interaction between two distributed clients that would be hindered by the delays of lazy bulk updates. Hence, in some embodiments, a distributed filesystem may be configured to selectively close the synchronization gap of such bulk update techniques when needed by enabling additional direct transfers of data between two cloud controllers that bypass the cloud storage system to synchronize changes for selected files more quickly. Such techniques support fast, granular interaction between two (or more) clients that are working on the same set of files via different cloud controllers.

The previous sections describe techniques that facilitate determining some of the situations in which such special synchronization efforts are needed. For instance, direct transfers of modified file data may be needed to facilitate collaboration when change notifications are sent to various cloud controllers of the distributed filesystem following a distributed oplock break request. For example, a cloud controller receiving a change notification for a file that one of its clients is currently reading would typically need to invalidate the client's file handle (e.g., via an oplock break) and provide the client with the updated version of the file as quickly as possible to provide strong read-after-close consistency. Alternatively, a new client request to open and edit a file that was recently modified remotely (e.g., a file with changes that have not yet been propagated to all of the cloud controllers via incremental metadata snapshots) may prompt the client's associated cloud controller to request a write lock as well as any recent changes to the requested file directly from the cloud controller that previously owned the file. In such collaborative scenarios it is especially desirable to propagate file modifications to collaborators as quickly as possible to reduce client access delays.

Unfortunately, traditional techniques for synchronizing files between locations have significant limitations. For example, the rsync protocol synchronizes a file between two locations by: (1) reading the versions of the file that are currently present at both locations and generating a set of checksums for each location; (2) exchanging these checksums between the two locations to determine which portions of the file are different and need to be synchronized; and then (3) updating the specified location with any file differences. Note, however, that file synchronization techniques that exchange checksums typically require both sites to access the complete file; thus, while each cloud controller will typically have access to (relatively) recent metadata for the file, one or both of the cloud controllers may need to download some or all of the file's data from the cloud storage provider. For example, a cloud controller may have initially downloaded the entire file's data, but due to subsequent cache evictions currently may now only still be caching a small portion of the file that is being actively operated upon by a client; in this scenario, the cloud controller attempting to calculate rsync checksums would need to re-download the rest of the file from the cloud storage provider. Alternatively, a cloud controller may have been receiving updated metadata for the file via incremental metadata snapshots but have not been updating the actual file data due to a break in client accesses, and hence have a cached version of file data that is substantially different from the most recent modified version; in this scenario, an cloud controller might need to either download portions of the out-of-date file from the cloud storage provider to perform relevant checksums or otherwise generate a substantially larger set of differences than would be desirable. In general, such limitations can lead to the consumption of considerable network bandwidth and lead to potentially substantial synchronization delays even if only a small portion of a file has changed.

Previous techniques disclosed for the distributed filesystem include a "cloud-aware deduplication copy" capability that takes advantage of the separation of data and metadata to substantially reduce the time needed to copy files without requiring file data to be downloaded to a cloud controller (as described in more detail in pending U.S. patent application Ser. No. 14/019,247, filed 5 Sep. 2013, entitled "Executing a Cloud Command for a Distributed Filesystem," by inventors Brian Christopher Parkison, Andrew P. Davis, John Richard Taylor, and Randy Yen-pang Chou, which is incorporated by reference in its entirety). More specifically, such techniques streamline file copy operations on a single cloud controller by generating metadata for a destination file that references existing data blocks in the cloud storage system, thereby avoiding the need to actually transfer data blocks for the source file to the cloud controller performing the copy operation. In some embodiments, cloud controllers synchronize file changes by leveraging metadata in a substantially similar manner. More specifically, two cloud controllers can exchange metadata and tracked metadata versioning information to reduce the amount of file data that needs to be transferred between the cloud controllers during a synchronization operation. Because a file's metadata is typically substantially smaller than the file's actual data, techniques that primarily compare and update the metadata of two cloud controllers can dramatically reduce the time delays and network bandwidth needed for synchronization operations.

Figure 11:
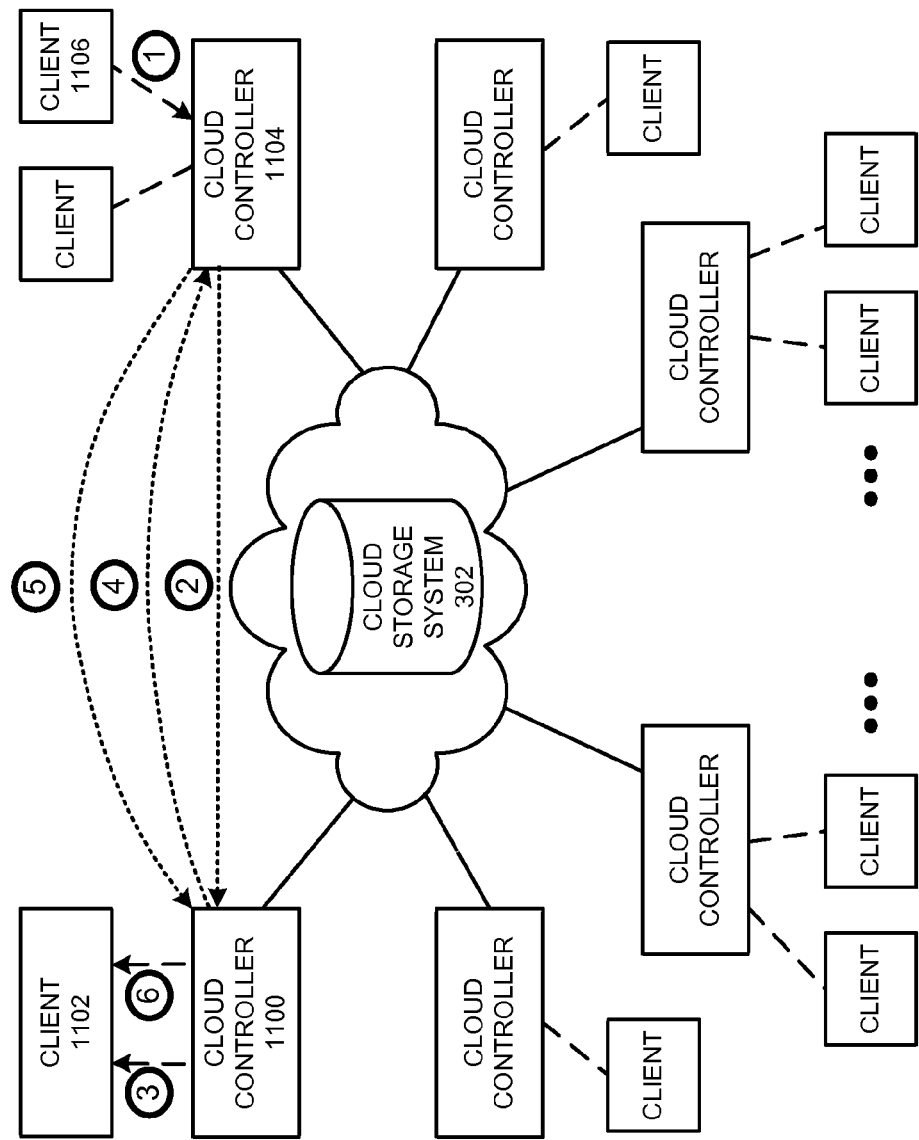
FIG. 11 illustrates a scenario in which two cloud controllers perform a file synchronization operation for a file in accordance with an embodiment.

FIG. 11 illustrates a scenario in which two cloud controllers perform a file synchronization operation for a file, file Z, using (primarily) metadata updates. As in earlier examples, file Z has been identified to need strong read-after-close consistency. Note that the distributed filesystem metadata maintained for each file on each cloud controller includes version information that tracks how that file has changed over time (e.g., one or more of a timestamp, file size, version identifier, etc.). Cloud controllers track and update the version information for files over time as changes are received for each file. For instance, upon receiving an incremental metadata update, a cloud controller may: (1) determine that the update includes (among other things) a set of metadata updates for file Z; (2) determine that the received version in the update is more recent than its local metadata version of file Z; and (3) apply the contents of the update to the metadata for file Z to bring the metadata for file Z up to date with the most recent version that was recently written on the cloud controller that send the incremental metadata update. The cloud controller can then subsequently use this updated metadata to access the most recent file data for file Z from cloud storage system 302 upon a client access of file Z.

At the start of the exemplary scenario of FIG. 11, two clients 1102 and 1106 have been collaboratively editing file Z, and both of their associated cloud controllers (1100 and 1104, respectively) have sent registration notification messages to all of the other cloud controllers in the distributed filesystem. Initially, client 1102 has read access to file Z, while client 1106 has been granted write access for file Z and cloud controller 1104 currently owns (and holds the write lock for) file Z. Client 1106 finishes writing file Z and closes file Z (operation 1), at which point cloud controller 1104 determines that (based on a recent registration notification message) cloud controller 1100 is registered to receive changes for file Z and sends a change notification for file Z to cloud controller 1100 (operation 2). To ensure read-after-close consistency, cloud controller 1100 invalidates any opportunistic locks held by client 1102 for file Z (e.g., via an oplock break, as described previously) (operation 3). At this point, if file Z were not identified as needing strong read-after-close consistency, cloud controller 1100 could wait for an eventual incremental metadata snapshot from cloud controller 1104 that describes the changes to file Z. However, because of the stronger consistency needed for file Z, cloud controller 1100 instead sends a direct request for an updated version of file Z to cloud controller 1104 (operation 4). This request includes identifying information (e.g., a version identifier) for the metadata version of file Z present on cloud controller 1100. Cloud controller 1104 receives this request and uses the included identifier for cloud controller 1100's metadata version for file Z to determine the set of metadata changes that are needed to update cloud controller 1100 to the newest version of file Z, and then sends a synchronization update containing these changes for file Z directly to cloud controller 1100 (operation 5). This synchronization update includes what is essentially an incremental metadata snapshot that only includes changes for file Z and an updated file version identifier for file Z; cloud controller applies this snapshot to its stored metadata to bring file Z up to date, and can then present an updated version of file Z to client 1102 (operation 6). Note that cloud controller 1100 will at some later point also receive an additional "normal" lazy incremental metadata snapshot that was broadcast by cloud controller 1104 to all of the cloud controllers in the distributed filesystem and includes the same changes for file Z that were already received directly from cloud controller 1104. Upon receiving this incremental metadata snapshot, cloud controller 1100 compares its current version information for file Z with the version information in the snapshot, detects that the two versions are the same; and determines that no additional changes need to be applied to file Z at this time.

In some embodiments, a synchronization update comprises a "recipe" that can be used by a receiving cloud controller to update an existing version of a file to the most recent version of the file that was recently written to the cloud controller that sent the update. The cloud controller with the most recent version of a file can use version information from the target cloud controller to craft a set of specific changes to the file's metadata ("deltas") that allow the target cloud controller to update the target file to the most recent version without requiring high-overhead checksum operations (for the actual file data) on both cloud controllers. Note that these metadata deltas that are sent are not the complete metadata for the file, but instead are a smaller set of changes that can be applied to the previous version of the metadata to bring it up to date with the most recent version of the metadata for the modified file. In general the deltas of a synchronization update may have the same format as the more general incremental metadata snapshots, but may be limited in scope to a single file and directed to a single cloud controller (instead of all of the cloud controllers and the cloud storage system). However, in some situations where a cloud controller is requesting synchronization updates for multiple files from another cloud controller the metadata deltas for multiple files might be grouped together into a single transfer. In general (e.g., for most file changes) metadata deltas are typically much smaller than both the data and metadata for the file; for example, the metadata for a one Gbyte file might be on the order of one Mbyte, while a metadata delta that is sent to describe a small change to the file might be on the order of a few Kbytes using the disclosed techniques.

Note that the deltas included in a synchronization update may include both metadata and data updates for the target file. For instance, in the example of FIG. 11, client 1106's changes to file Z typically may involve both updated metadata as well as some new, additional (and/or modified) file data. Cloud controller 1104 will eventually (lazily) write the file data changes for file Z to cloud storage system 302 via an incremental data snapshot, but for reasonable collaboration performance such file data changes may need to be received by cloud controller 1100 and presented to client 1102 more quickly. Hence, the synchronization update may also include an incremental data snapshot that includes any file data that has changed for (or been added to) file Z subsequent to the metadata version send by cloud controller 1100. For some file changes only a small amount of (or even no) data may need to be sent; at the other extreme, if a new file is being created and written all of the file data for the new file may need to be sent. Sending updated file data for file Z directly to cloud controller 1100 as part of the synchronization update allows cloud controller 1100 to present the new version of file Z to client 1102 as quickly as possible. After processing the synchronization update, the receiving cloud controller logically has the entire copy of the modified file, even if only a small amount of new data and metadata were included in the synchronization update and only a small part (or even none) of the previous version of the file is actually cached locally on that cloud controller. More specifically, the receiving cloud controller either has the metadata needed to download any portions of the file data that are stored in the cloud storage system or has already directly received any new or updated data that is not yet available in the cloud storage system from the other cloud controller, and hence can access any file data needed for a client request or a pre-fetch operation.

Consider the advantages of the described synchronization update techniques for a specific example in which file Z is a 2.5 hour long video file that is 2 Gbytes in size (which includes roughly 2 Mbytes of metadata), and client 1106 has been editing only the last five minutes of the video file. In such a situation, an rsync operation would require both cloud controllers to download the full movie and perform checksums for the entire file to calculate the differences between their two file versions. In contrast, the disclosed techniques do not require the entire video file to be cached or downloaded to either cloud controller; each cloud controller only needs to cache the portion that is being actively used (or modified) by clients. Upon receiving a synchronization update request for the file, cloud controller 1106 sends only the metadata deltas and any file data deltas that are not yet available via the cloud storage system on an incremental, per-file basis. Note that such deltas can also be sent in a compressed format (unlike for rsync synchronization operations, which typically run in user space and thus operate upon uncompressed files). Hence a synchronization update might involve transferring only small, compressed metadata deltas (e.g., on the order of 20-40 Kbytes for this example) along with any specific associated (compressed) file data changes.

Note that synchronization updates are typically user-transparent; end users may know that they are collaboratively working on one or more files together, but continue to access such files normally without needing to perform any special behavior or commands. Each associated cloud controller determines the operations being requested by the accessing clients, sends registration notification messages as needed, and determines from the accesses requested by each client whether write locks and synchronization updates are needed for each given file. For instance, when a given client requests to open a file to make a write, its associated cloud controller (in the process of requesting the write lock from the owning cloud controller) may determine that another client has recently edited the file and initiate a synchronization update to ensure that all recent changes are received prior to making any further edits to the file.

In some embodiments, cloud controllers sending a request for a write lock to the owning cloud controller for a file may be configured to always include version identification information for the requested file to ensure that they have the most recent metadata for the requested file. The owning cloud controller can determine whether the requestor has a current version, and if not, send a synchronization update along with the write lock.

Figure 12:
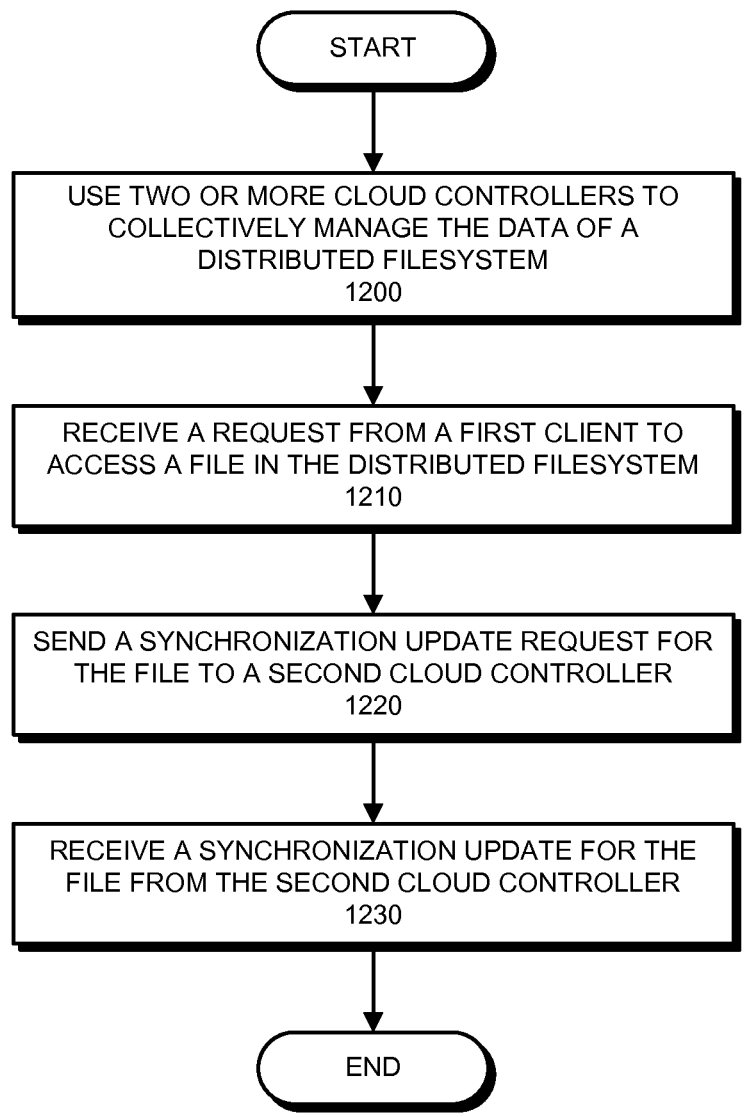
FIG. 12 presents a flow chart that illustrates the process of synchronizing file updates between two cloud controllers for a distributed filesystem in accordance with an embodiment.

FIG. 12 presents a flow chart that illustrates the process of synchronizing updates between two cloud controllers for a distributed filesystem. Two or more cloud controllers collectively manage the distributed filesystem data that is stored in one or more cloud storage systems (operation 1200); the cloud controllers cache and ensure data consistency for the stored data. During operation, a cloud controller receives a request from a client to access a file in the distributed filesystem (operation 1210). The cloud controller sends a synchronization update request for the file to a second cloud controller (operation 1220) and, in response, receives a synchronization update for the file from the second cloud controller (operation 1230).

In some embodiments, synchronization updates may be initiated by cloud controllers either proactively or reactively based on a range of circumstances and user requests. While the above examples describe scenarios in which synchronization updates are sent in response to a change notification or a request for a write lock, synchronization updates may be used in any situation in which a cloud controller needs to bypass the latency associated with (lazy) incremental metadata updates to quickly get a current version of a file from another cloud controller. In some embodiments, synchronization behavior may also be customized based on a file type, a locality policy, or other parameters.

Previous techniques disclosed for the distributed filesystem include techniques that enable cloud controllers to pre-fetch data that is anticipated to be needed by a client from the cloud storage system (as described in more detail in pending U.S. patent application Ser. No. 13/295,844, filed 14 Nov. 2011, entitled "Pre-Fetching Data for a Distributed Filesystem," by inventors John Richard Taylor, Randy Yenpang Chou, and Andrew P. Davis, which is incorporated by reference in its entirety). Pre-fetches that successfully anticipate client requests can substantially reduce client file access latencies. In some embodiments, cloud controllers can also proactively "pre-synchronize" files based on one or more criteria to also reduce client file access latencies. More specifically, cloud controllers may attempt to optimize file access performance by selectively sending pre-emptive synchronization requests to other cloud controllers before a client has actually opened or requested a write lock for a given file.

In some embodiments, cloud controllers may be configured to detect or otherwise determine sets of files that are likely to be opened and written (and thus synchronized) together, and pre-synchronize related files upon receiving a first file request for the related group of files (or directories). For instance, some examples of file groupings include (but are not limited to):

- video projects: videos projects typically include a number of associated files that include an actual video stream, one or more accompanying audio tracks, one or more subtitle tracks, associated image files, and other support files. A client application editing a video file (e.g., adding five minutes of additional video) is likely to subsequently update the audio stream, subtitles, and other components in a specific workflow sequence. Thus, pre-synchronizing such other files as soon as the client requests write access of the video file is likely to reduce client access delays at a later time when these other components are requested. Note that a cloud controller may perform multiple pre-synchronization requests for the same components over time to ensure that multiple subsequent changes are synchronized as needed.
- construction projects: construction projects typically include a number of computer-aided design (CAD) files that specify the structure of a building as well as a number of overlays to this structure (e.g., for electrical wiring, plumbing, sewage, lighting, etc). Each of these different facets may be in separate files that are all associated with a master drawing. A change in a master drawing or an overlay is likely to result in subsequent related changes in one or more other files.
- spreadsheets: the master file for a spreadsheet is likely to be associated with a spreadsheet template and may include pages that reference other spreadsheets or embedded documents. A client application opening the master document is hence likely to subsequently reference these other files. A cloud controller retrieving such a master document in response to a client access request might, upon detecting the file type, scan the contents of the file while transferring it to the client to determine and pre-synchronize any referenced files already.

Pre-synchronizing related files can be particularly beneficial when multiple distributed users are collaborating on a shared project; ensuring that two (or more) clients can view updates to the full set of synchronized data as quickly as possible can enable users to iterate on design changes more quickly, thereby reducing user frustration and improving productivity.

In some embodiments, cloud controllers may be configured to pre-synchronize files based on (but not limited to) one or more of the following:

- pre-specified file groupings: files of a given file type may be known to be associated with a number of other files. Such file types and their associated dependent files and/or file types may be explicitly identified as candidates for pre-synchronization (e.g., via a locality policy or some other mechanism) so that when a first file is accessed (and synchronized) all of the other companion files are also synchronized. Note that the set of such companion files may be limited or potentially very large (e.g., thousands of companion files, or more).
- tracked application behavior: some applications may be known to keep a large number of files open for reading while users are working on them, and then only open those files with write access when the users are saving their work. Cloud controllers may be able to determine files that are candidates for pre-synchronization by tracking application behavior and/or the set of files that a current client currently has open.
- spatial and/or temporal locality: based on temporal locality, files that were previously modified together in a closely time-aligned set of transactions are likely to subsequently be modified together again. Cloud controllers may track such file groupings to infer groups of files that are likely to be opened and/or edited in conjunction and hence might benefit from subsequent pre-synchronization.
- scanned contents: as described above, cloud controllers may be able to scan file contents that are being sent to clients to detect references to other files, and pre-synchronize those other files. Such techniques typically will involve some knowledge of how to parse the internal structure of the scanned file.

Note that pre-synchronization techniques can be particularly beneficial when a client opens the first file of a given project and has not yet sent out any registration notification requests. For instance, consider a client requesting to read a spreadsheet file for the first time. The template for this spreadsheet may have just been updated on another client associated with a remote cloud controller, but the first client's cloud controller has not yet received an incremental metadata snapshot indicating the change. The first client is only opening the spreadsheet and its associated template now, and hence its associated cloud controller will not receive a change notification for the updated spreadsheet template because it hadn't registered interest in that file yet at the time that the change occurred. Normally the cloud controller might wait for the client to actually access the template file before contacting the remote cloud controller to synchronize the file, resulting in additional client access latency (e.g., the round trip latency between the two cloud controllers, the latency to prepare the synchronization update, and the transfer time for the synchronization update). However, if the first cloud controller detects and pre-synchronizes the template file (e.g., by scanning the spreadsheet file or detecting the dependency between the two files), this additional client access latency is avoided; the most recent version of the updated file may already be available locally when the client requests to open the template file.

In summary, techniques for directly synchronizing changes between cloud controllers can propagate file modifications to collaborators more quickly, thereby facilitating distributed collaborative work across a distributed filesystem. Proactively pre-synchronizing related files can also help to further reduce client access delays by ensuring that modified data is synchronized before it is needed.

Byte-Range Locks

The techniques disclosed in the previous sections describe managing file ownership and access at a per-file granularity. For instance, a client that requests to exclusively write a file either receives an exclusive lock to the entire file (even if it only seeks to modify a single byte of the file) or fails (e.g., receives a sharing violation).

In some embodiments, cloud controllers allow clients to perform byte-range locking on files, thereby enabling fine-granularity file access and sharing. More specifically, cloud controllers can be configured to allow multiple clients to request and lock specific portions of a given file (as long as the requested byte ranges do not collide). Note that the supported byte ranges and the number of simultaneous locks for files may be implementation dependent. For instance, some implementations may support small, large, and/or variable sized byte-range locks for files. Different byte-ranges of the same file may simultaneously be owned and accessed by different cloud controllers and clients, and a specific byte-range may also be simultaneously accessed by multiple clients as long as the access types and sharing modes for those clients are complementary. For example, a number of clients may request (and be granted) shared byte-range locks that allow shared read access to the first half of a file while another client simultaneously holds an exclusive write byte-range lock for the last third of the file. In another example, multiple clients may request exclusive byte-range locks for different parts of a file and simultaneously modify their respective (distinct) regions.

Supporting byte-range locking in a distributed filesystem may involve some additional trade-offs and complexity. For instance, different cloud controllers receiving client requests to access a portion of a file may need to determine which specific byte ranges of the file are already being locked by other cloud controllers. In some embodiments, each given file may still be owned (e.g., have access managed by) a single cloud controller, with each respective cloud controller now also managing byte-range locks for the files that it owns. Other cloud controllers send requests to an owning cloud controller to "check out" byte-range locks for a file, and the tracking information for the byte-range locks can be transferred to another cloud controller as needed if the overall ownership for the file changes. In alternative embodiments, ownership may be managed at a finer (sub-file) granularity, and the ownership of specific portions of a file may be managed (and transferred) independently. Note that some of these techniques may involve higher overhead than per-file granularities, and hence may only be selectively supported for a limited subset of the files in the distributed filesystem.

In some embodiments, some aspects of byte-range (as well as whole-file) accesses may be guided by the client application. For instance, client applications may be allowed to specify the desired response when a requested lock is not available; e.g., client applications may be given the option of having a request fail immediately if there is a sharing conflict or of being queued to wait until the requested file (or byte-lock range of the file) is available. An application developer that is aware of such capabilities can optimize application behavior accordingly. For example, an application developer that knows that multiple client application instances are likely to simultaneously access different byte ranges in the same file may ensure that the application performs writes and then releases write locks as quickly as possible and specify that the application should wait on unavailable byte ranges; more specifically, the application developer knows that locked resources are likely to be freed again quickly, and this known write behavior reduces the potential negative consequences (and uncertainty) that are typically associated with queuing to wait on locked resources.

Another example of application awareness involves file append behavior. Clients can lock the end of the file to append new data. For instance, an application may be able to specify the EOF (end-of-file) for the file in a byte-range lock request, and then (if the lock is granted) write new data to the end of the file. If the application is known to always append regular-size blocks to the end of a file, multiple clients executing the application might be configured to request and be granted different byte ranges past the EOF, and append their respective new blocks to the file simultaneously. If, however, the application is known to append variable-sized chunks of data to the end of files, such techniques may lead to file fragmentation, and the application writer may instead customize application behavior to ensure that only one application instance can append to the file at a time (and that all other application instances that attempt to append in the same timeframe need to wait on the EOF byte-range lock). Alternatively, in some instances an application writer might ensure that the application pads the file (e.g., adds additional blank data to the end of the file) so that application instances can each lock and then write their new data to specified (different) locations in the (padded) file.

Note that in some embodiments byte-range locks may be applied to any arbitrary offset within a file. Furthermore, non-owning cloud controllers that are already holding a byte-range lock may be able to directly handle some additional byte-range lock requests that apply to the same portion of the file. Consider, for instance, a scenario in which the lessor for a file (e.g., the owner of the namespace that contains the file) manages multiple shared client write accesses to the file. In one implementation, the lessor manages all byte-range locks for the file; e.g., the lessor keeps track of all of the outstanding shared and/or exclusive byte-range locks for the file, and is queried every time any other cloud controller's client requests or releases a byte-range lock for the file. In an alternative implementation, a non-owning cloud controller (e.g., a "lessee") is authorized to manage further byte-range lock requests that fall within the scope of existing byte-range locks that are already held by the lessee. For instance, a lessee that has already received a byte-range lock for a portion of a file and receives a second byte-range lock request that is completely within the same (already locked) region may grant or deny the second byte-range lock request without contacting the lessor if there is sufficient local information available to make the decision. For example, if a shared byte-range lock has been granted to the lessee, the lessee may grant a second shared byte-range lock request for a sub-range of that locked portion before contacting the lessor, and then subsequently send a lock request to the lessor asynchronously for bookkeeping. In another example, a lessee holding an exclusive byte-range lock for a portion of the file may deny a second subsequent shared (or exclusive) byte-range lock request that applies to the same portion of the file without contacting the lessor. Managing a subset of byte-range lock requests on non-owning cloud controllers when sufficient local information is available to make the decision can reduce network and file-access latencies for the file and reduce the load on the lessor.

The following section illustrates an exemplary scenario in which byte-range locks are leveraged to optimize a specialized (append-only) access behavior.

Optimized Techniques for Shared Files with Append-Only Write Behavior

Previous sections disclose a range of techniques that can be leveraged to facilitate and improve the performance of collaboration between multiple distributed clients that are collaboratively modifying the same file. In some embodiments, cloud controllers may be configured to identify situations that involve an even higher level of collaboration and, upon determining that file accesses meet a specified set of criteria, optimize synchronization behavior and byte-range locks to even further improve collaboration support and performance.

Figure 13:
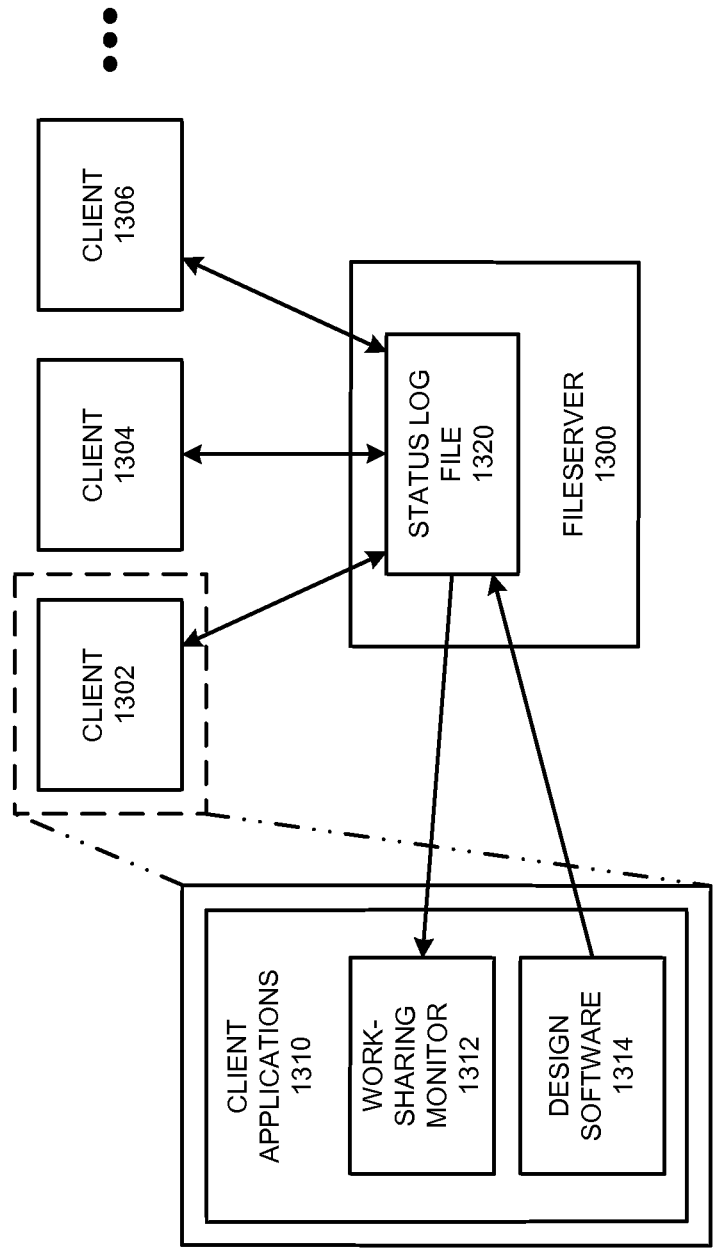
FIG. 13 illustrates an exemplary scenario in which a large number of clients collaborate on a shared project design and track status changes using a single shared status log file in accordance with an embodiment.

Consider, for instance, an exemplary scenario in which a large number of clients each execute instances of an application that collaborate on a shared project design and track status changes using a single shared status log file (as illustrated in FIG. 13 in the context of a single stand-alone fileserver 1300). In FIG. 13, clients 1302-1306 all execute a set of related client applications 1310 that access shared status log file 1320. For instance, client applications 1310 may comprise a set of design software components that are being used to design the model of a building to be constructed, including a design software application 1314 that end-users use to directly edit the model for the building and a work-sharing monitor 1312 that conveys status updates for the model to the users (e.g., by polling the status log file 1320 for status changes and then displaying such changes to each user).

When a user begins executing the design software 1314 and opens the project files for the model, design software 1314 opens the status log file 1320 for the model for writing, and logs (e.g., appends) a session entry to indicate that the user is currently editing the model. Design software 1314 appends status information for the actions that are performed by each user on the model to status log file 1320, and then subsequently also appends a status log entry when the user stops editing the model and closes the project files. The work-sharing monitor applications 1312 for all of the clients working on the same project are configured to check the status log file 1320 for that project frequently (e.g., multiple times every second) to detect such status changes, and notify the end-users in real time of who else is actively working on the model, any operations that are being undertaken on the model, and/or such operations' status (e.g., by displaying a status bar that shows an operation's status). Such status updates allow individual users to schedule their own activities more carefully (e.g., to avoid conflicts), and the log file also provides an audit trail that can be used to isolate and debug problems. Note that while design software 1314 may be configured to allow users to work on the model at the same time, each user may operate upon a local copy of project files that is cached by the client and then "check in" their changes to a master copy when they are done. In this context, design software 1314 may log which portion of the model a given user is working on, and then indicate when the user "checks the changes in" (e.g., synchronizes the changes back into the master copy so that other users can also see and access the changes). Other users can see the associated status changes for these operations in the work-sharing monitor 1312, and might for instance: (1) delay checking in their own changes to the model until the other person's changes have been committed; or (2) upon being informed that another person's changes have been successfully checked in, request and inspect the previous user's updates. Note that the shared status log file does not provide access control for the project and does not necessarily display the specific changes that users have made to the model (e.g., status changes will typically indicate what users are working on, but do not display the actual project file data that is being modified).

Logistically, the above scenario involves an even higher level of collaborative file management than described in the previous sections. There is typically one such special shared status log file per model/project, which means that the design software on each client that is accessing the shared project opens and appends status changes to the shared log file for its associated user for the extent of their design session, thereby requiring support for multiple potentially concurrent writes to the shared log file when multiple clients are working on the same project simultaneously. Meanwhile, the work-sharing monitor on each client constantly polls the file to detect and propagate any changed status to users as quickly as possible. In a scenario where the multiple clients all access a shared status log file that is hosted on a single fileserver, this fileserver can ensure that the connected clients access the shared log file with file buffering disabled (e.g., all writes and reads are required to pass through to the fileserver), and can then append newly received status information to the shared log file in the order in which it is received from clients. Note, however, that extending such collaboration support to a distributed filesystem is more challenging.

In some embodiments, cloud controllers leverage both the techniques described in the previous sections as well as some additional capabilities to provide a substantially similar level of collaboration support for a shared status log file that is stored in a distributed filesystem. More specifically, cloud controllers can be configured to: (1) provide distributed clients with the appearance of multiple concurrent write support for shared files (using byte-range locking) and (2) take advantage of an append-only file write access pattern to further reduce the time delay for synchronization updates, thereby ensuring that updates (and write locks) for such shared files are propagated between cloud controllers as quickly as possible.

In some embodiments, a set of cloud controllers are configured to use byte-range locking to enable shared writes to a shared status file in certain special circumstances (e.g., a shared status log file). More specifically, cloud controllers may be configured to detect such special accesses and allow all of the requesting clients to open such files for writing, and then enable clients to leverage byte-range locking to ensure that clients don't overwrite each other's write data. For instance, cloud controllers may be configured to allow shared multiple write access for clients that are trying to open a specific supported file type (e.g., a file type with an extension such as ".slog" that is known to be used for shared status log files with append-only write behavior). The cloud controllers then work together to support the abstraction of multiple concurrent writes and ensure that data written to this file does indeed remain consistent by rapidly migrating an exclusive byte-range write lock that locks beyond the end of the file throughout the system to each cloud controller that receives an actual write from a client for that file. Note that the cloud controllers simultaneously grant shared read-only byte-range locks for the rest of the shared status log file, thereby ensuring that the work-sharing monitor applications can read previously written data safely (and also ensuring that no clients can perform non-appending writes to the file).

In some embodiments, cloud controller configuration optimizations that support the abstraction of multiple concurrent writers may include (but are not limited to):

- disabling opportunistic writes for the shared file: by disabling oplocks for such files, cloud controllers ensure that all writes and reads for the shared file are routed immediately to a cloud controller, thereby reducing update latencies for the shared file as much as possible.
- leveraging change notification capabilities: cloud controllers can leverage the previously described distributed registration and change-notify capabilities to ensure that all involved cloud controllers can determine which cloud controller is likely to currently own the byte-range write lock for the shared file, thereby allowing write locks and file changes to be acquired as quickly as possible (e.g., to update work-sharing monitors). Cloud controllers send out appropriate registration notifications whenever one of their clients opens the project and status log files. Note, however, that change-notify behavior may need to be adjusted for special file access situations. For instance, the design software on the client may be configured to keep the status log file open for writing for a user's entire design session (e.g., not close the status log file between writes). Thus, cloud controllers may be configured to send change-notify messages after events other than file close. For example, the design software may perform writes to a status log file by issuing a CIFS file lock command, appending the new status information to the status log file, and then issuing a CIFS file unlock command; in such scenarios, cloud controllers may be configured to send change notifications whenever the status log file is written and unlocked (instead of closed).

using byte-range locking to simultaneously support shared reads and exclusive writes: cloud controllers may used byte-range locking for a shared status log file to provide work-sharing monitor applications with shared read access while simultaneously providing the design software with a byte-range lock that allows new data to be appended to the log file. In scenarios where status updates are written relatively infrequently the probability of multiple clients simultaneously writing a status log file may be fairly low, making collisions fairly unlikely. However, in some situations two cloud controllers may receive file writes from their clients at substantially the same time. Only one of the cloud controllers can successfully receive the byte-range write lock for the file from the owning cloud controller, so other cloud controllers that are trying to write status information at the same time temporarily queue to wait for the lock until it becomes available again.

In some embodiments, cloud controllers also leverage known append-only write characteristics to further optimize synchronization updates. As described previously, normal "lazy" incremental metadata snapshots and rsync-based synchronization techniques have limitations that make them less ideal for propagating changes for files that are being simultaneously accessed by multiple collaborators. The previous section discloses a set of synchronization techniques that allow cloud controllers to compare their metadata for the file and send synchronization updates that comprise primarily metadata deltas and (only the) modified file data that is not yet available via the cloud storage system. Such techniques involve less overhead and reduce the size of intra-cloud-controller data transfers, thereby substantially reducing synchronization delays. However, such techniques can be improved upon even further when the file being collaborated upon is known to only receive new data appended to the end of the file.

Consider a scenario in which a cloud controller has an out-of-date version of a shared file that is known to only receive writes as file appends. When contacting another cloud controller to request a synchronization update (e.g., in response to a change notification), the two cloud controllers already know that the differences will only be in some trailing portion of the file that follows the EOF (end-of-file) for the version of the file that is on the requesting cloud controller. Thus, if the requesting cloud controller specifies the size of its version in its request, the receiving cloud controller can simply reply with the metadata and file data for the (newly appended) trailing bytes of the file (e.g., the metadata and file data for the portion of the current file that spans from the previous EOF to the current EOF), thereby avoiding the need to perform metadata comparisons for the entire file completely. In many scenarios the newly appended data is typically fairly small in size (especially in comparison to the overall size of the file), so the resulting synchronization update both involves substantially less computation overhead as well as very little network bandwidth, which facilitates quickly propagating updates across the distributed filesystem.

In some embodiments, cloud controllers are configured to automatically piggy-back the size information for their local version of a file onto a synchronization request when requesting the latest version of a file that has been identified to (1) need collaboration support and (2) receive only append-only writes. For instance, a cloud controller requesting a write lock or a synchronization update for such a file knows that it will need the most recent file version, and hence can already include the size information in that request. Note that this size information is quite compact, so that even in situations in which the remote file version has not actually changed (e.g., in the case of a write lock request) and no updates need to be sent, having the requesting cloud controller include such size information in the request does not significantly change the request message size.

Note that the work-sharing monitor can also optimize file access behavior based on the append-only write behavior for a status log file. More specifically, if the write behavior for a shared status log file is known to be append-only, the work-sharing monitor applications on each client can also track and leverage the EOF location (e.g., the previous known size of the file) for their most recent read of the file. The work-sharing monitor application typically does not keep the file open, but instead opens, reads, and closes the file frequently. On each subsequent read attempt, the work-sharing monitor application can: (1) open the file; (2) use the tracked file size to check whether the file size has increased; (3) if so, read (and display) any new status information that follows the previous EOF and update the tracked file size appropriately; and (4) close the file again. Note also that a cloud controller that receives a change notification for a status log file from another cloud controller can determine whether any client is still accessing the file. If not, the cloud controller may simply cache the change notification and not update the file. Alternatively, if one or more clients are known to still be accessing the file the cloud controller might either: (1) pre-emptively synchronize the new version of the file; or (2) wait until the next actual write access by the design software or the next read access from the work-sharing monitor before synchronizing. In the read case, the work-sharing monitor can automatically detect the size change after the cloud controller has synchronized the file, retrieve the new portion of the file, and update its project status display appropriately.

Note that while the above techniques are explained in the context of shared status log files and exemplary construction design projects, such techniques are not limited to this specific file type, project type, or industry, and may be applied in any distributed filesystem scenario in which distributed clients perform multiple concurrent append-only writes upon a shared file. In some embodiments the specific file types and/or situations that involve such support may be pre-specified (e.g., based on a specified file type, location in a project directory or in the filesystem hierarchy, or via a locality policy). In some alternative embodiments, cloud controllers may detect append-only writes and collaborative behavior for a file and collectively decide to enable such optimizations for that file.

Figure 14:
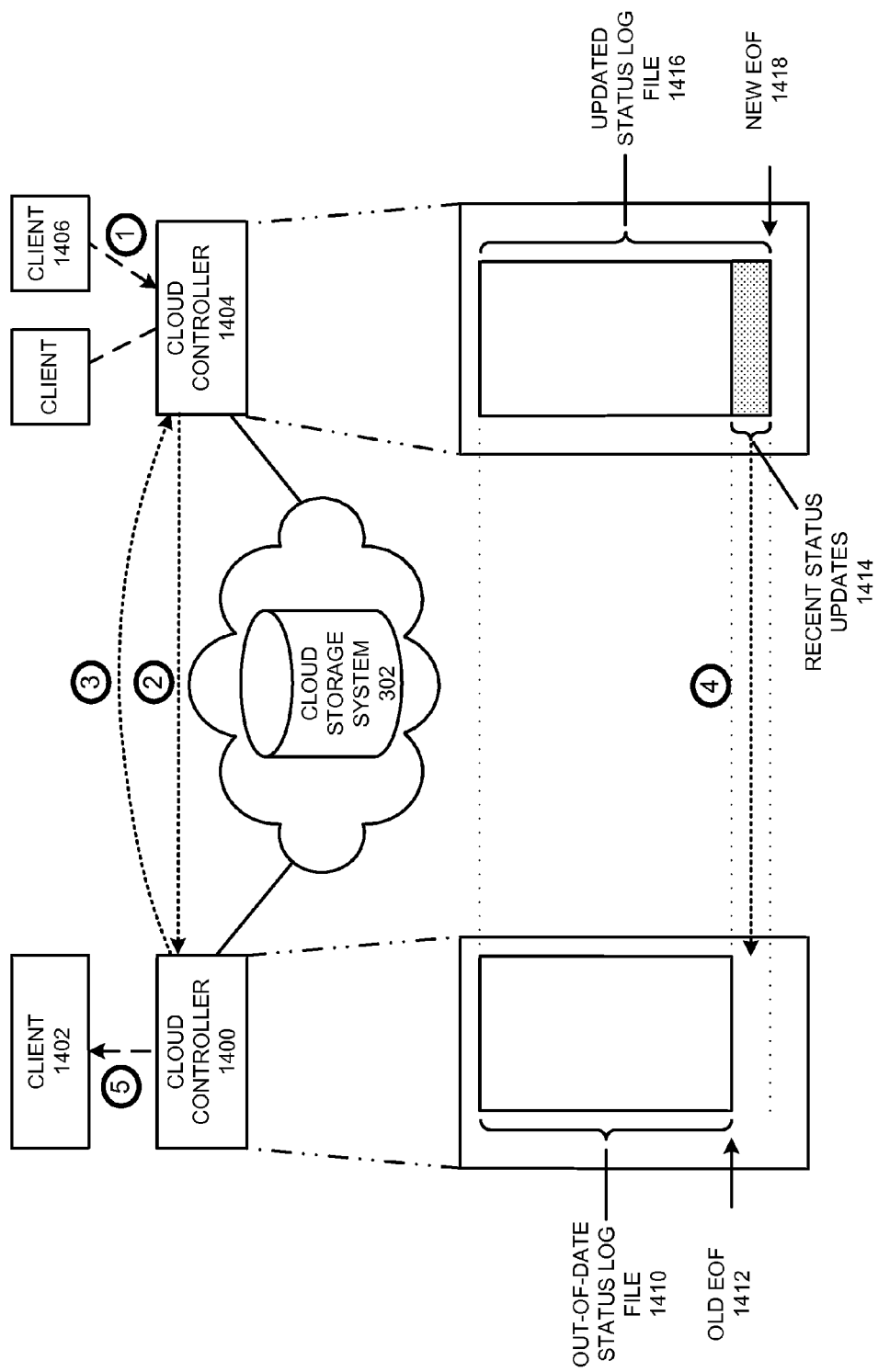
FIG. 14 illustrates a scenario in which multiple cloud controllers operate upon a shared status log file that is only modified via appending writes in accordance with an embodiment.

FIG. 14 illustrates a scenario in which multiple cloud controllers operate upon a shared status log file that is only modified via appending writes. Note that while only two cloud controllers are illustrated in FIG. 14, the described techniques can scale to a distributed filesystem with an unlimited number of cloud controllers.

At the start of the exemplary scenario of FIG. 14, users executing design software on clients 1402 and 1406 open the same set of project files. One of these project files, "Z.slog,"

is determined by the two clients' associated cloud controllers (1400 and 1404) to be a status log file that needs support for multiple concurrent writes and receives append-only writes. For instance, the cloud controllers may make this determination based on one or more of the following: (1) the design software opening file Z.slog using a special write-only access mask and a specific sharing mode; (2) the cloud controllers being configured to have special rules that are associated with a ".slog" extension; and (3) the work-sharing monitor on clients 1402 and 1404 simultaneously requesting read-only monitoring on the file in parallel with the design software's requested write-only access. Upon determining the need for special handling, cloud controllers 1400 and 1404 both send out registration notification messages to all of the other cloud controllers in the distributed filesystem to ensure that they will be notified of any changes to file Z.slog. Note that in this example cloud controller 1404 is the initial owner of the EOF (append) byte-range write lock for file Z.slog.

At some subsequent time, the user on client 1406 performs an action in the design software that triggers new status information to be written to the shared status log file (operation 1). Cloud controller 1404 already has the EOF byte-range write lock for the file and thus can proceed with the file write (i.e., no other cloud controller can currently append to the file); cloud controller 1404 proceeds to append the recent status updates 1414 to the status log file, resulting in updated status log file 1416. After writing the file, cloud controller sends out a change notification to all of the cloud controllers that are registered for the file, including cloud controller 1400 (operation 2). Cloud controller 1400 receives the change notification, determines that its local status log file 1410 is now out-of-date, determines (either pre-emptively or in response to a file read from the work-sharing monitor on client 1402) that a synchronization update is needed for file Z.slog, and sends a synchronization update request for file Z.slog to cloud controller 1404 (operation 3). Because file Z.slog has been identified as an append-only file, cloud controller 1400 knows to include the old EOF 1412 for its out-of-date status log file 1410 in this synchronization update request. Upon receiving this request, cloud controller 1404 compares the enclosed old EOF 1412 with its updated local EOF 1418, and responds by only sending recent status updates 1414 (and deltas for any updated metadata for the status log file) to cloud controller 1400 (operation 4). The work-sharing monitor on client 1402 detects that the Z.slog file has been updated (e.g., that the EOF has changed from its previous tracked EOF) on a subsequent read request, retrieves the recent status updates that are now available from cloud controller 1400 (operation 5), and displays the status updates to the user of client 1402.

In summary, cloud controllers may be able to substantially improve collaborative file access performance for a distributed filesystem when client file accesses meet a specified set of criteria. For instance, cloud controllers can leverage byte-range locking and optimize synchronization updates to take advantage of append-only write behavior, thereby reducing the set of comparisons that need to be made on cloud controllers and reducing the amount of data that needs to be transferred over the network. Such techniques allow design tools (such as Autodesk Revit™) that use shared log files to still be used by clients over wide-area-networks from widely-distributed geographic locations; status information can be rapidly propagated through the distributed filesystem to ensure that clients can operate as if they were all located in a single location and accessing a single fileserver.

Computing Environment

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. Additional techniques can be applied to reduce access and propagation delays for files that are being collaboratively edited and/or accessed by remote clients via different cloud controllers. Hence, the disclosed embodiments present an abstraction of one global, extensible filesystem while preserving the abstraction of high-speed local data access.

Figure 4:
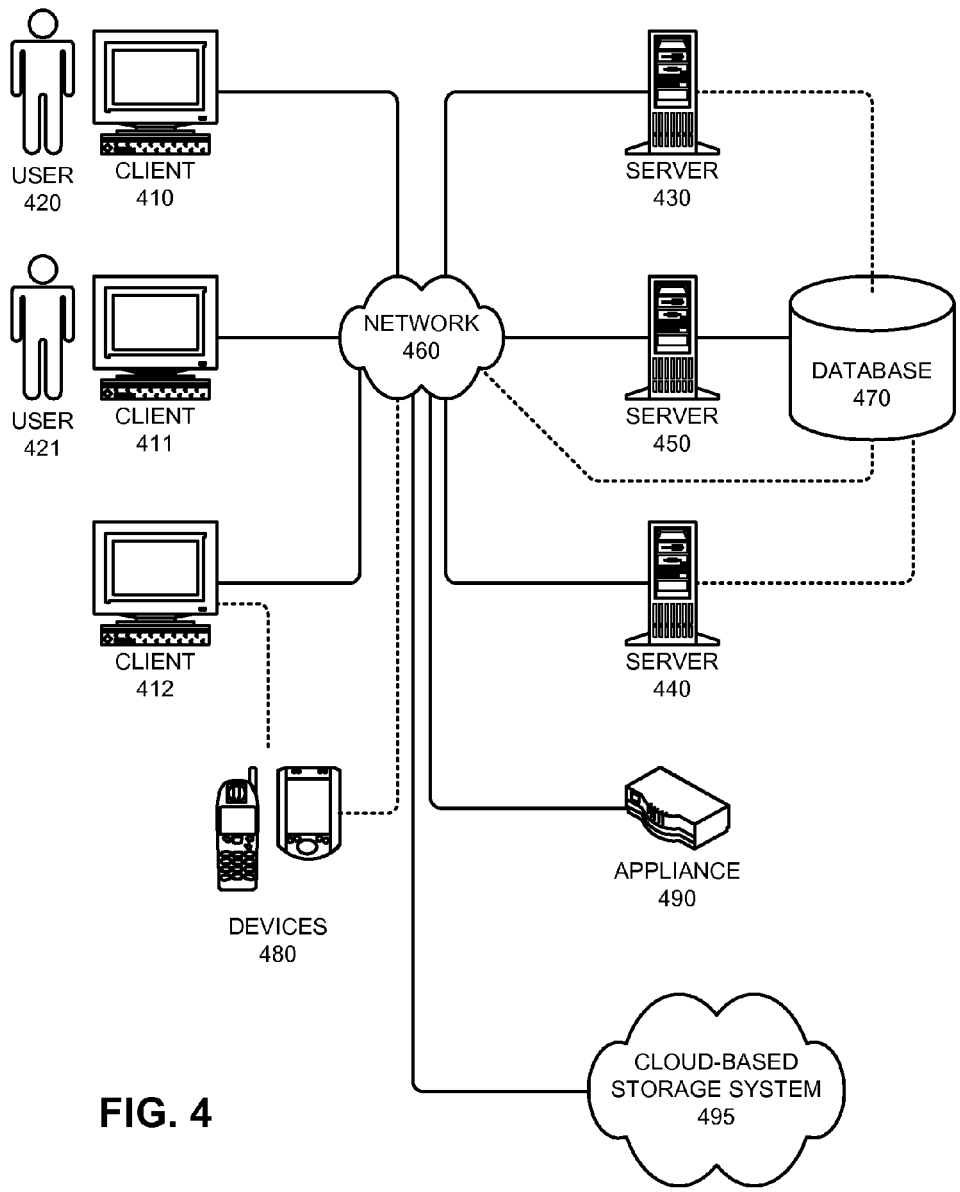
FIG. 4 illustrates a computing environment in accordance with an embodiment.

In some embodiments of the present invention, techniques for managing and/or accessing a distributed filesystem can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
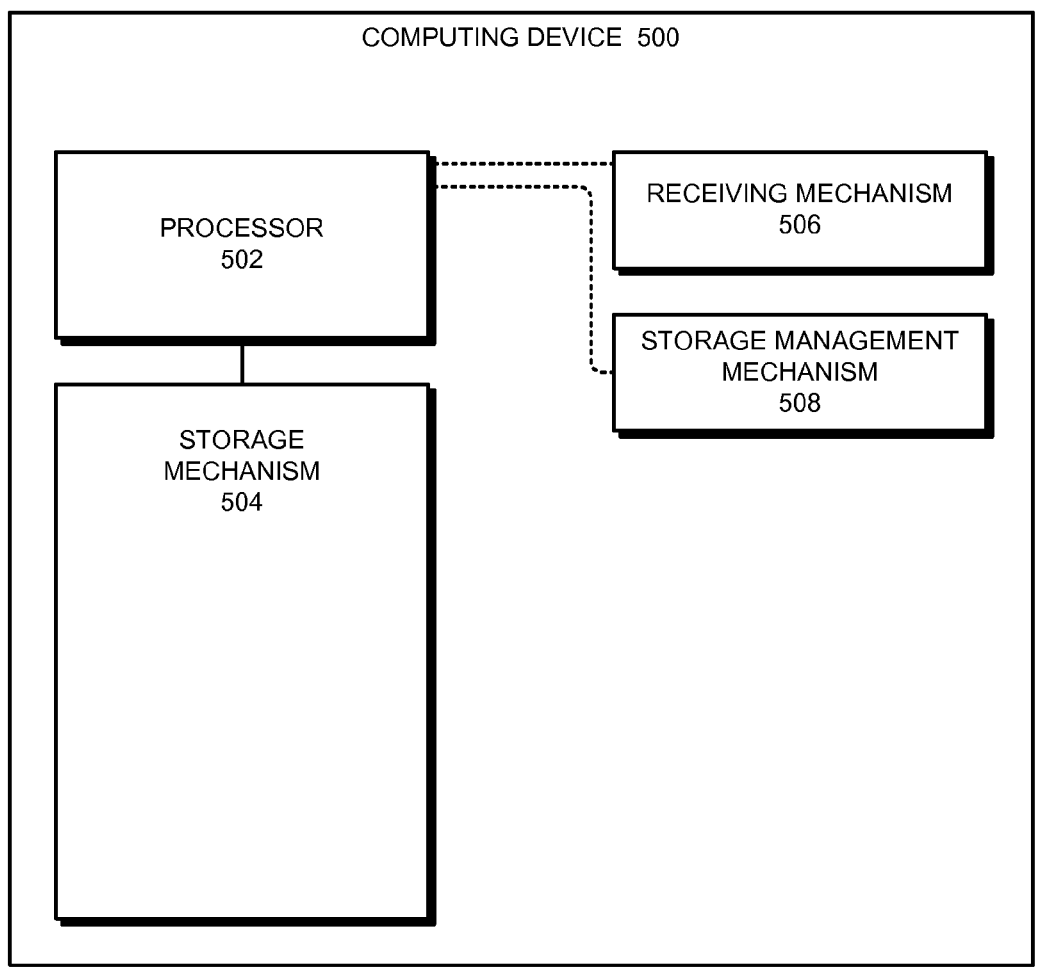
FIG. 5 illustrates a computing device in accordance with an embodiment.

FIG. 5 illustrates a computing device 500 that includes a processor 502 and a storage mechanism 504. Computing device 500 also includes a receiving mechanism 506 and a storage management mechanism 508.

In some embodiments, computing device 500 uses receiving mechanism 506, storage management mechanism 508, and storage mechanism 504 to manage data in a distributed filesystem. For instance, storage mechanism 504 can store metadata for a distributed filesystem, and computing device 500 can use receiving mechanism 506 to receive a request to access a data block for a file. Program instructions executing on processor 502 can traverse the stored metadata to identify a metadata entry that is associated with the data block. Storage management mechanism 508 can use this metadata entry to download a cloud file containing the data block from a cloud storage system.

In some embodiments of the present invention, some or all aspects of receiving mechanism 506, storage management mechanism 508, and/or a filesystem device driver can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 506, storage management mechanism 508, and/ or a filesystem device driver may be performed using general-purpose circuits in processor 502 that are configured using processor instructions. Thus, while FIG. 5 illustrates receiving mechanism 506 and/or storage management mechanism 508 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for requesting distributed change notifications for a distributed filesystem, the method comprising:

collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems, wherein cloud controllers distribute updates for modified files that do not need strong read-after-write consistency via lazy incremental metadata snapshots, wherein files that are being collaborated upon by multiple clients and/or client processes need strong read-after-write consistency, wherein changes to files that need strong read-after-write consistency need to be propagated to any clients accessing such files as quickly as possible after such files are written and closed;

receiving at a first cloud controller a request from a client to access a file in the distributed filesystem;

determining that the file needs strong read-after-write consistency; and sending a registration notification from the first cloud controller to all of the other cloud controllers of the distributed filesystem, wherein the registration notification requests that the first cloud controller receive expedited notification of any changes to the file, wherein cloud controllers track the set of registration notification requests received from other cloud controllers for files in the distributed filesystem, wherein a second cloud controller receives the registration notification request, wherein a given registration notification requests change notifications for a range of filesystem scopes that include a specific file, a directory, and a portion of the distributed filesystem hierarchy;

wherein the second cloud controller subsequently receives a file write and a subsequent file close request for the file from a second client;

wherein the second cloud controller determines from its tracked set of registration notification requests that the first cloud controller has registered to receive change notifications for the modified file and sends a change notification message for the modified file to the first cloud controller;

wherein cloud controllers are configured to send change notification messages for a given modified file to only the set of cloud controllers that have previously sent notification requests with filesystem scopes that apply to the given modified file, thereby supporting strong read-after-write consistency while reducing the number of change notification messages that need to be sent between cloud controllers; and wherein cloud controllers that did not send notification requests for the given modified file are informed of updates to the given modified file lazily via a subsequent incremental metadata snapshot.

2. The computer-implemented method of claim 1, wherein sending the given registration notification with a coarse granularity of filesystem scope facilitates supporting strong read-after-write consistency for multiple files while reducing the number of registration notifications that are broadcast to all of the cloud controllers of the distributed filesystem.

3. The computer-implemented method of claim 1, wherein determining that the file needs strong read-after-write consistency involves one or more of the following:
   determining from the file's extension, file type, and/or location in the filesystem hierarchy that the file needs strong read-after-write consistency;
   using a set of heuristic-based techniques that analyze file contents to determine a file type and/or predict access behavior to determine that the file needs strong read-after-write consistency; and
   determining from a locality policy that the file needs strong read-after-write consistency.

4. The computer-implemented method of claim 1, wherein determining that the file needs strong read-after-write consistency involves tracking client file accesses to dynamically identify files that are being collaboratively accessed by one or more clients.

5. The computer-implemented method of claim 1,
   wherein registration notifications are associated with an expiration time interval; and
   wherein cloud controllers track the expiration time interval for each received registration notification and retire expired registration notifications.

6. The computer-implemented method of claim 5, wherein the method further involves:
   tracking the expiration time interval for the registration notification at the first cloud controller;
   determining that the client will access the file beyond the expiration time interval; and
   sending a subsequent registration notification for the file from the first cloud controller to all of the other cloud controllers for the distributed filesystem prior to the expiration of the first registration notification to ensure that no change notifications are missed between the expiration of the first registration notification and the receipt of the subsequent registration notification.

7. The computer-implemented method of claim 1,
   wherein the second cloud controller receives a request to perform a namespace operation for the file from the client; and
   wherein the second cloud controller is configured to send a subsequent change notification message for the namespace operation to all of the cloud controllers that have registered to receive change notifications for the file.

8. The computer-implemented method of claim 1, wherein the method further comprises sending a synchronization update request from the first cloud controller to the second cloud controller to retrieve the modifications made to the file by the second client.

9. A non-transitory computer-readable storage medium storing instructions that when executed by a computer cause the computer to perform a method for requesting distributed change notifications for a distributed filesystem, the method comprising:
   collectively managing the data of the distributed filesystem using two or more cloud controllers, wherein collectively managing the data comprises storing the data for the distributed filesystem in one or more cloud storage systems, wherein the cloud controllers cache and ensure data consistency for data stored in the cloud storage systems, wherein cloud controllers distribute updates for modified files that do not need strong read-after-write consistency via lazy incremental metadata snapshots, wherein files that are being collaborated upon by multiple clients and/or client processes need strong read-after-write consistency, wherein changes to files that need strong read-after-write consistency need to be propagated to any clients accessing such files as quickly as possible after such files are written and closed;
   receiving at a first cloud controller a request from a client to access a file in the distributed filesystem;
   determining that the file needs strong read-after-write consistency; and
   sending a registration notification from the first cloud controller to all of the other cloud controllers of the distributed filesystem, wherein the registration notification requests that the first cloud controller receive expedited notification of any changes to the file, wherein cloud controllers track the set of registration notification requests received from other cloud controllers for files in the distributed filesystem, wherein a second cloud controller receives the registration notification request, wherein a given registration notification requests change notifications for a range of filesystem scopes that include a specific file, a directory, and a portion of the distributed filesystem hierarchy;
   wherein the second cloud controller subsequently receives a file write and a subsequent file close request for the file from a second client;
   wherein the second cloud controller determines from its tracked set of registration notification requests that the first cloud controller has registered to receive change notifications for the modified file and sends a change notification message for the modified file to the first cloud controller
   wherein cloud controllers are configured to send change notification messages for a given modified file to only the set of cloud controllers that have previously sent notification requests with filesystem scopes that apply to the given modified file, thereby supporting strong read-after-write consistency while reducing the number of change notification messages that need to be sent between cloud controllers; and
   wherein cloud controllers that did not send notification requests for the given modified file are informed of updates to the given modified file lazily via a subsequent incremental metadata snapshot.

10. The non-transitory computer-readable storage medium of claim 9,
    wherein registration notifications are associated with an expiration time interval; and wherein cloud controllers track the expiration time interval for each received registration notification and retire expired registration notifications.

11. The non-transitory computer-readable storage medium of claim 10, wherein the method further involves:
tracking the expiration time interval for the registration notification at the first cloud controller;
determining that the client will access the file beyond the expiration time interval; and
sending a subsequent registration notification for the file from the first cloud controller to all of the other cloud controllers for the distributed filesystem prior to the expiration of the first registration notification to ensure that no change notifications are missed between the expiration of the first registration notification and the receipt of the subsequent registration notification.

12. A cloud controller that requests distributed change notifications for a distributed filesystem, comprising:
a processor;
a storage mechanism that stores metadata for the distributed filesystem; and
a storage management mechanism;
wherein two or more cloud controllers collectively manage the data of the distributed filesystem, wherein collectively managing the data comprises storing the data for the distributed filesystem in one or more cloud storage systems, wherein the cloud controllers cache and ensure data consistency for data stored in the cloud storage systems, wherein cloud controllers distribute updates for modified files that do not need strong read-after-write consistency via lazy incremental metadata snapshots, wherein files that are being collaborated upon by multiple clients and/or client processes need strong read-after-write consistency, wherein changes to files that need strong read-after-write consistency need to be propagated to any clients accessing such files as quickly as possible after such files are written and closed;
wherein the cloud controller is configured to receive a request from a client to access a file in the distributed filesystem;
wherein the storage management mechanism determines that the file needs strong read-after-write consistency; and
wherein the storage management mechanism is configured to send a registration notification from the first cloud controller to all of the other cloud controllers of the distributed filesystem to request that the cloud controller receive expedited notification of any changes to the file, wherein cloud controllers track the set of registration notification requests received from other cloud controllers for files in the distributed filesystem, wherein a second cloud controller receives the registration notification request, wherein a given registration notification requests change notifications for a range of filesystem scopes that include a specific file, a directory, and a portion of the distributed filesystem hierarchy;
wherein the second cloud controller subsequently receives a file write and a subsequent file close request for the file from a second client;
wherein the second cloud controller determines from its tracked set of registration notification requests that the cloud controller has registered to receive change notifications for the modified file and sends a change notification message for the modified file to the cloud controller
wherein cloud controllers are configured to send change notification messages for a given modified file to only the set of cloud controllers that have previously sent notification requests with filesystem scopes that apply to the given modified file, thereby supporting strong read-after-write consistency while reducing the number of change notification messages that need to be sent between cloud controllers; and
wherein cloud controllers that did not send notification requests for the given modified file are informed of updates to the given modified file lazily via a subsequent incremental metadata snapshot.

* * * * *